(12) United States Patent
Miller

(10) Patent No.: US 12,172,481 B2
(45) Date of Patent: Dec. 24, 2024

(54) TRACK-DRIVEN OUTDOOR VEHICLE

(71) Applicant: Kent Miller, Brookings, SD (US)

(72) Inventor: Kent Miller, Brookings, SD (US)

( * ) Notice: Subject to any disclaimer, the term of this patent is extended or adjusted under 35 U.S.C. 154(b) by 506 days.

(21) Appl. No.: 17/674,528

(22) Filed: Feb. 17, 2022

(65) Prior Publication Data
US 2022/0266643 A1    Aug. 25, 2022

Related U.S. Application Data

(60) Provisional application No. 63/151,546, filed on Feb. 19, 2021.

(51) Int. Cl.
*B60F 3/00* (2006.01)

(52) U.S. Cl.
CPC .......... *B60F 3/003* (2013.01); *B60F 2301/04* (2013.01)

(58) Field of Classification Search
CPC .......... B60F 3/00; B60F 3/003; B60F 3/0038; B60F 3/0053; B60F 3/0061; B60F 3/0069; B60F 3/0076; B60F 2301/04; B62D 21/183; B62D 55/06

USPC ....................................................... 440/12.5
See application file for complete search history.

(56) References Cited

U.S. PATENT DOCUMENTS

| | | | |
|---|---|---|---|
| 7,329,161 B2 | 2/2008 | Roering | |
| 8,998,284 B1* | 4/2015 | Minahan | A01K 97/01 135/901 |
| 2004/0055630 A1* | 3/2004 | Olson | B60P 3/14 180/9.1 |

* cited by examiner

*Primary Examiner* — Daniel V Venne
(74) *Attorney, Agent, or Firm* — Suiter Swantz IP

(57) ABSTRACT

A vehicle includes a hull defining one or more holes in a keel of the hull. The one or more holes are provided for ice fishing from the one or more holes. The holes include a hatch or a tube extending upwards, for preventing water from entering the hull. The vehicle also includes continuous track assemblies for providing traction on an ice surface. The continuous track assemblies may also provide a motive force when the vehicle is suspended in water. By the hull design, the vehicle may float on the water, allowing the vehicle to access ice surfaces which may otherwise be inaccessible to ice-fishers. The vehicle also increases safety while fishing during thin or unstable ice conditions.

20 Claims, 25 Drawing Sheets

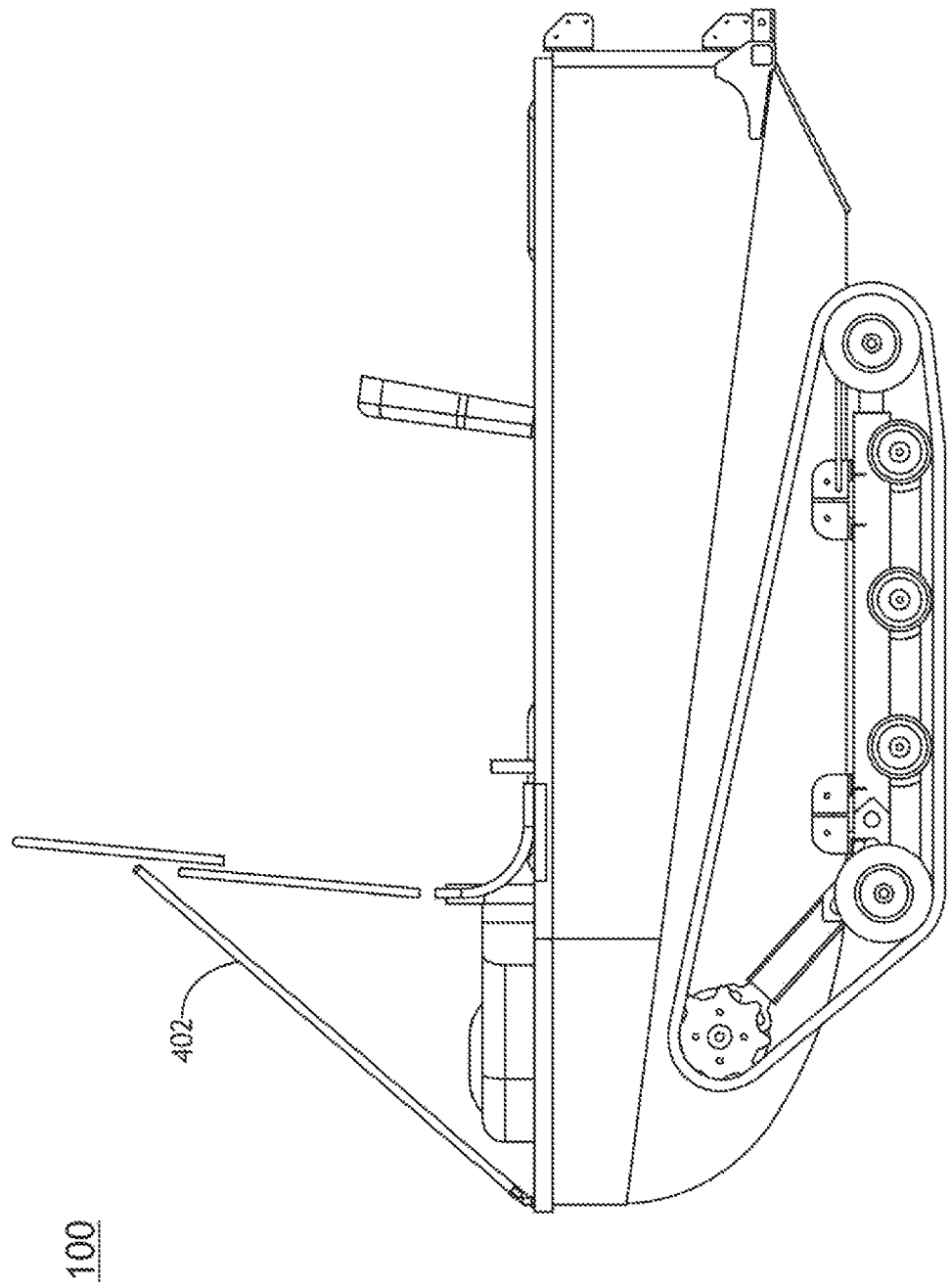

TRACK-DRIVEN OUTDOOR VEHICLE

CROSS-REFERENCE TO RELATED APPLICATION

The present application claims the benefit under 35 U.S.C. § 119(e) of U.S. Provisional Patent Application Ser. No. 63/151,546, filed on Feb. 19, 2021, titled TRACK-DRIVEN OUTDOOR VEHICLE, naming Kent Miller as inventor, which is incorporated herein by reference in the entirety.

TECHNICAL FIELD

The present invention generally relates to outdoor vehicles and, more specifically, to all-terrain outdoor vehicles.

BACKGROUND

Outdoor vehicles are used for many sports and activities all year long. One outdoor activity in particular, ice fishing, takes place on the ice. The length of the ice fishing season may be based on ice conditions such as thickness, which is similarly based on ambient temperature. Outdoor vehicles may traverse the ice to transport a passenger to a desired ice fishing location on a lake or other body of water. The outdoor vehicles may include wheeled vehicles. Such wheeled vehicles may include insufficient traction and maneuverability. Wheeled vehicles may also be difficult to transport due to size considerations. Furthermore, wheeled vehicles may spread weight unevenly across an area by contact between the wheel and the ice surface, causing a potential for a breakthrough event on thin or unstable ice. As such, it would be desirable to provide an outdoor vehicle that may be easier to transport, more maneuverable, increase traction in slippery conditions, and safely spread weight of the vehicle across an area to traverse thin ice.

SUMMARY

A vehicle is disclosed, in accordance with one or more embodiments of the present disclosure. In one illustrative embodiment, the vehicle includes a hull defining at least one hole in a keel of the hull. In another illustrative embodiment, the at least one hole is provided for ice fishing from within the vehicle. In another illustrative embodiment, the vehicle includes a hatch configured to detachably attach to the hole. In another illustrative embodiment, the hatch includes a gasket configured to provide a watertight seal for the at least one hole when the hatch is attached to the hole. In another illustrative embodiment, the vehicle includes a chassis coupled to the hull. In another illustrative embodiment, the vehicle includes at least one seat coupled to the hull. In another illustrative embodiment, the vehicle includes a first continuous track assembly and a second continuous track assembly. In another illustrative embodiment, the first continuous track assembly and the second continuous track assembly are disposed exterior to the hull and extend below the hull for supporting the vehicle when the vehicle is disposed on land. In another illustrative embodiment, the first continuous track assembly and the second continuous track assembly are configured to be independently driven for propelling and steering the vehicle. In another illustrative embodiment, the vehicle is positively buoyant when the hatch is attached to the at least one hole and the vehicle is disposed in water having an average density of 1 gram per cubic centimeter.

A vehicle is disclosed, in accordance with one or more embodiments of the present disclosure. In one illustrative embodiment, the vehicle includes a hull defining at least one hole in a keel of the hull. In another illustrative embodiment, the at least one hole is provided for ice fishing from within the vehicle. In another illustrative embodiment, the vehicle includes a tube extending vertically upwards from the at least one hole and including a top opening. In another illustrative embodiment, the vehicle includes a chassis coupled to the hull. In another illustrative embodiment, the vehicle includes at least one seat coupled to the hull. In another illustrative embodiment, the vehicle includes a first continuous track assembly and a second continuous track assembly. In another illustrative embodiment, the first continuous track assembly and the second continuous track assembly are disposed exterior to the hull and extend below the hull for supporting the vehicle when the vehicle is disposed on land. In another illustrative embodiment, the first continuous track assembly and the second continuous track assembly are independently driven for propelling and steering the vehicle. In another illustrative embodiment, the vehicle is positively buoyant when the vehicle is disposed in water having an average density of 1 gram per cubic centimeter. In another illustrative embodiment, the vehicle comprises an unloaded weight and a displaced volume such that a waterline of the water is below the top opening of the tube when the vehicle is disposed in the water.

BRIEF DESCRIPTION OF THE DRAWINGS

Implementations of the concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numerals in the drawings may represent and refer to the same or similar element, feature, or function. In the drawings:

FIG. 4B illustrates a side view of a vehicle including frame members of a windscreen in an unfolded position, in accordance with one or more embodiments of the present disclosure;

DETAILED DESCRIPTION

Figure 1A:
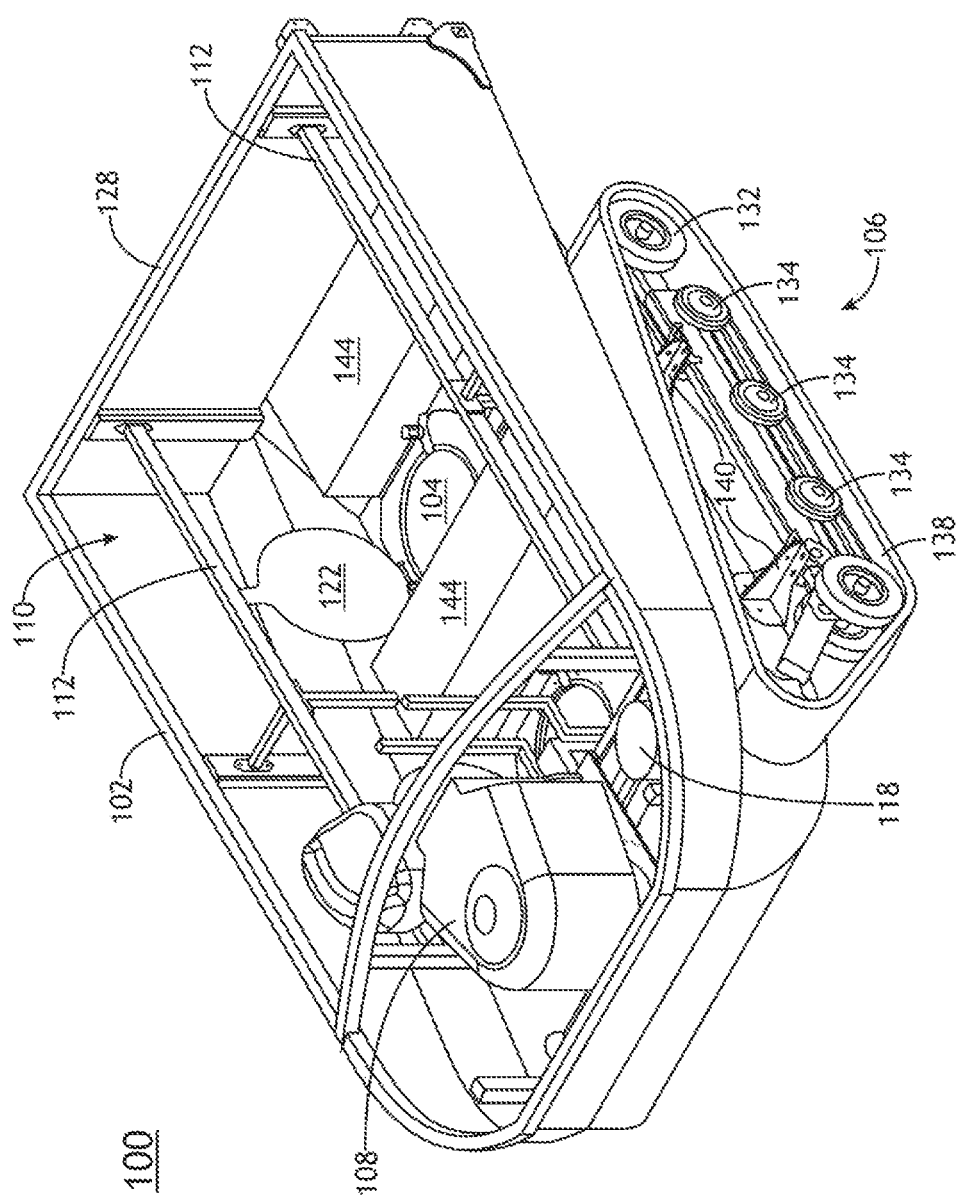
FIG. 1A illustrates a front perspective view of a vehicle, in accordance with one or more embodiments of the present disclosure.
Figure 1B:
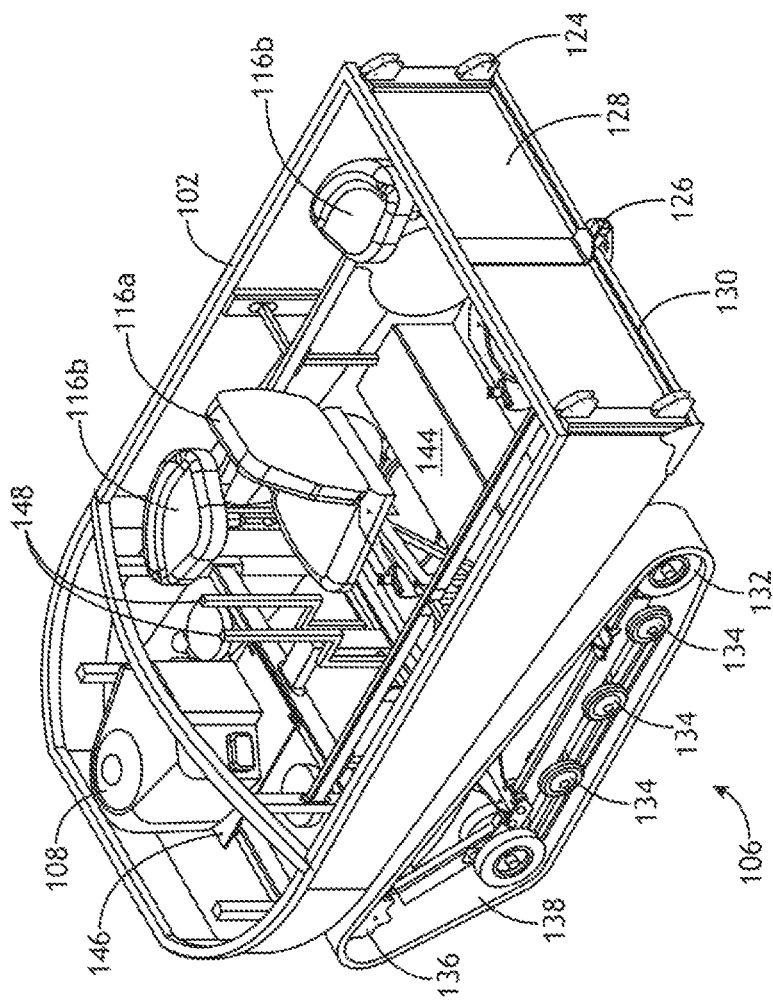
FIG. 1B illustrates a rear perspective view of a vehicle, in accordance with one or more embodiments of the present disclosure.
Figure 1C:
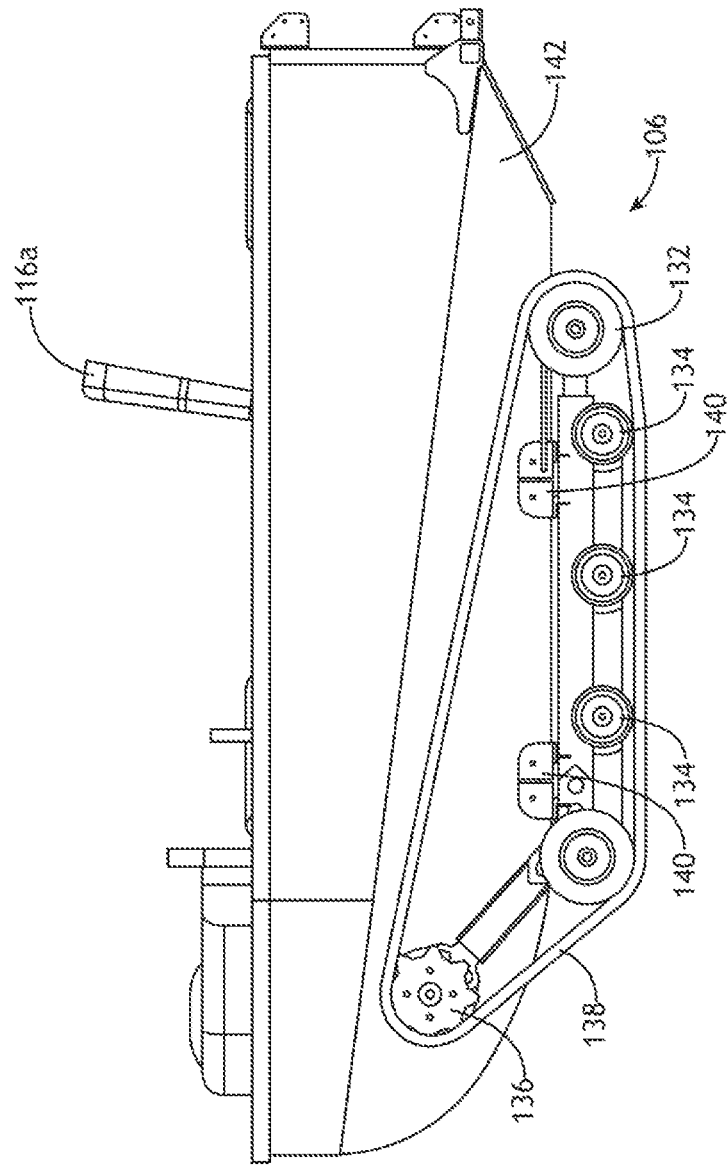
FIG. 1C illustrates a side view of a vehicle, in accordance with one or more embodiments of the present disclosure.
Figure 1D:
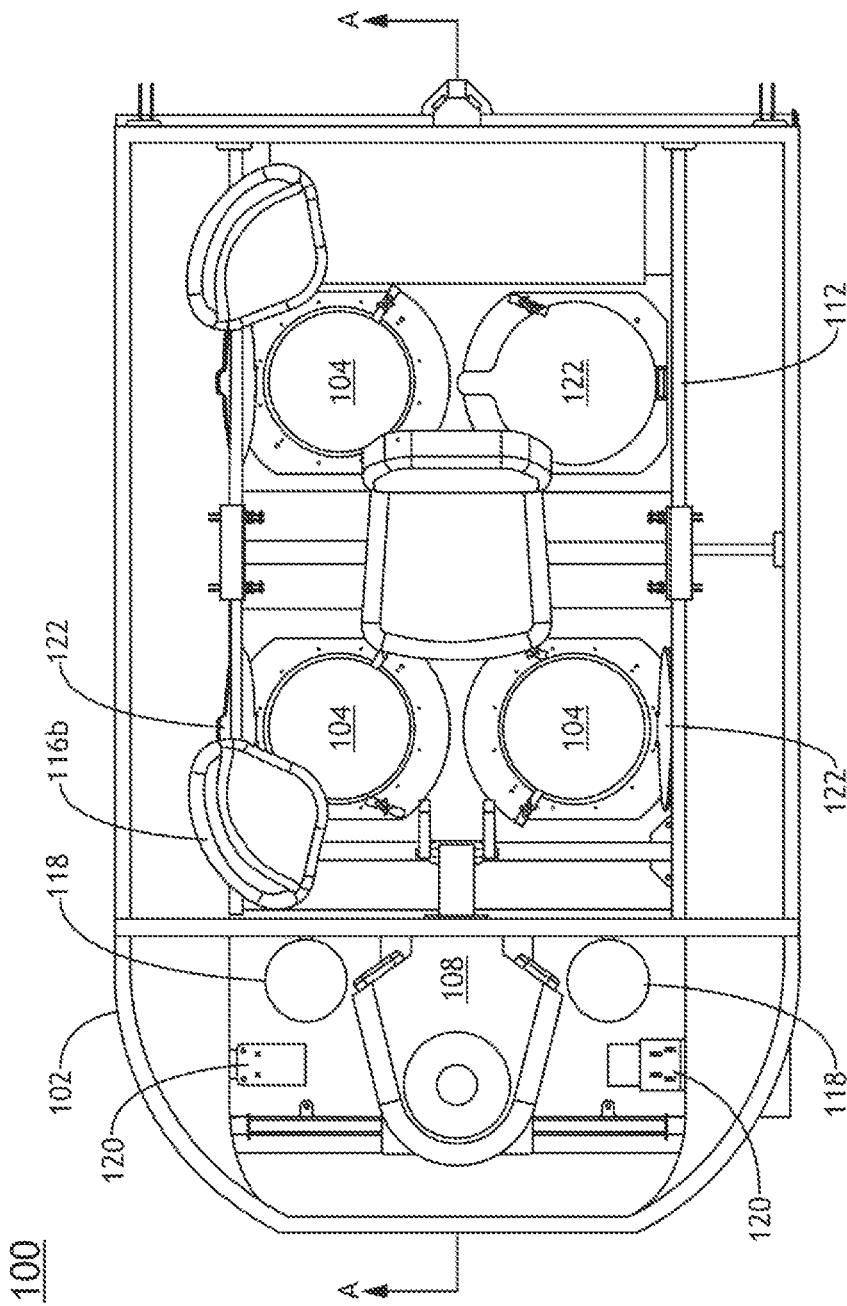
FIG. 1D illustrates a top plan view of a vehicle, in accordance with one or more embodiments of the present disclosure.

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure. Reference will now be made in detail to the subject matter disclosed, which is illustrated in the accompanying drawings.

Reference will now be made in detail to the subject matter disclosed, which is illustrated in the accompanying drawings. Referring generally to FIGS. 1A through 6B, a vehicle is described, in accordance with one or more embodiments of the present disclosure. Embodiments of the vehicle are designed to allow safe access to thin or unstable ice via a floatable hull and a track system. Advantageously, the track system of the vehicle may distribute a weight of the vehicle 100 across a length of the track system. By such distribution of the weight, a pressure on the tracks, and similarly an ice surface bearing the tracks, may be proportionally reduced. The ability to reduce the pressure on the ice surface may allow the vehicle to traverse ice which may otherwise be unsafe to traverse. In this regard, the vehicle may be used to traverse thin ice to reach an ice fishing spot having a thicker ice. The hull may also displace a volume of water when the vehicle is disposed in water. By the displaced volume, the vehicle may be positively buoyant such that the vehicle floats. In this regard, the vehicle may traverse open spaces of water to reach a patch of ice for fishing. Once the vehicle reaches the ice, the track system may be employed to pull the vehicle onto the ice, even while the vehicle is surrounding by broken ice or heavy slush. By the climbing onto the ice from the water, the vehicle may be used to get onto ice patches which would otherwise be inaccessible for ice fishing purposes such that an effective length of the ice fishing season may be increased (e.g., going out early or late into the season). Once the vehicle has reached the destination, one or more hatches may be opened to provide access to a hole in the keel of the hull. It is noted herein the terms "outdoor vehicle", "amphibious vehicle", and "vehicle" used throughout the present disclosure are meant to refer to embodiments disclosed herein and may be used interchangeably.

Referring now to FIGS. 1A-1E, a vehicle 100 is described, in accordance with one or more embodiments of the present disclosure. In embodiments, the vehicle 100 includes a hull 102. The hull 102 may be configured to provide an external surface for the vehicle 100. By a nonlimiting example, the hull 102 may include a keel with a sloped or flat bottom and one or more side walls. The walls of the hull 102 may optionally include an opening for a door, such as a rear opening in the transom 128. It is noted herein the hull 102 may be made from any material known in the art such as, aluminum, molded plastic, wood, fiberglass, and the like. The keel may define one or more holes 104. Such holes 104 may be provided for accessing an ice surface below the vehicle 100. In this regard, the vehicle 100 may be driven onto a patch of ice. Once the vehicle 100 is disposed above a patch of ice the holes 104 may be uncovered allowing access to the ice below the vehicle 100. An auger may then be inserted into the holes and used to drill a fishing hole in the ice. Such holes 104 may include any suitable diameter for receiving the auger. The holes 104 may thus provide the ability to ice fish from the vehicle 100. In this regard, a user may ice fish while remaining in the vehicle 100, reducing a danger associated with ice-fishing on thin ice. Although the vehicle 100 is depicted as including four of the holes 104 in a two-by-two configuration, this is not intended to be limiting. In this regard, the vehicle may include any number of the holes 104 in any suitable configuration. However, the two-by-two configuration may be advantageous in allowing for lines to be dropped into multiple ice fishing holes.

In embodiments, the vehicle 100 includes a hatch 122. The hatch 122 may include a gasket (e.g., an O-ring, or the like) by which the hatch 122 is configured to provide a watertight seal for the hole 104. By the watertight seal, the hatch 122 and the hole 104 may be impermeable to water when the water is exerting a standard pressure on the seal (e.g., standard pressure determined based on the vehicle 100 floating on the water).

In embodiments, the vehicle 100 is positively buoyant when the one or more holes 104 are sealed and the vehicle 100 is disposed in the water. In this regard, the hull 102 may displace a sufficiently large volume of water such that the buoyancy force of the water displaced exceeds a weight of the vehicle 100. The hatch 122 may attach to the hull 102 thereby providing a watertight seal for preventing water from passing through the hole 104. The hatch 122 may attach to the hull 102 in a number of configurations. The hatch 122 may attach to the hull 102 by a hinge-mounting. Alternatively, the hatch 122 may be detachably attachable to the hull 102. The hatch 122 may thus uncouple from the hull 102 to provide an opening of the hull 102 of the vehicle 100 to the environment underneath the vehicle 100. For example, the hatch 122 may open the hull 102 of the vehicle 100 to ice or water underneath the vehicle 100 for fishing access.

In embodiments, the vehicle 100 includes a continuous track assembly 106. The continuous track assembly 106 may be provided on each side of the vehicle 100 (e.g., left and right sides). A motive force may be provided by the continuous track assembly 106 for propelling the vehicle on land and/or in the water. The continuous track assembly 106 may include one or more components, such as, but not limited to, a track tensioner 132, one or more idler bogies 134 (also referred to as idler wheels, idler bogey, and the like), a drive sprocket 136 (also referred to as a drive wheel), a tread 138, and one or more mounting brackets 140. The tread 138 may include rubber tracks with internal steel links which are engaged with the drive sprocket 136 and tensioned by the tensioner 132.

The continuous track assembly may be disposed exterior to the hull and coupled to the hull 102. A portion of the continuous track assembly may also extend below the hull for supporting a weight of the vehicle 100 when the vehicle 100 is disposed on land. The continuous track assembly 106 may thus spread the weight of the vehicle 100 across a load bearing ice surface. For example, the continuous track assembly 106 may spread the weight of the vehicle 100 such that an average pressure between the tread 138 and the ground surface is between 1.2 and 1.8 pounds per square inch. In this manner, the distribution of weight of the outdoor vehicle 100 may allow driving on ice thicknesses of about 1.5 inches or higher. The ability to drive on ice with such thickness is advantageous in increasing conditions on which ice-fishing may occur. In this regard, a recommended safe ice thicknesses (e.g., safe ice thickness recommendation for a person) is 4 inches, well above the 1.5-inch thickness capability. It is to be understood, that as the loaded-weight of the vehicle 100 increases, the average pressure of the treads 138 may similarly increase, such that thicker ice is required to meet sufficient ice bearing strength.

In embodiments, the hull 102 includes a shape, such as, but not limited to, a displacement hull. For example, the hull 102 may include a flat-bottom displacement hull, a round-bottom displacement hull, and the like. The flat-bottom displacement hull may be advantageous in improving a stability of the vehicle 100 when floating in the water. In embodiments, the bow of the hull 102 includes a shape which is disposed between the fore end and the bottom. For example, the bow of the hull 102 may include, but is not limited to, a plumb bow, a spoon bow, and the like with a rounded edge or other type of edge. The continuous track assembly 106 may be attached offset from the fore end of the hull 102, such that a front end of the tread 138 is disposed at or near to the bottom of the hull 102. The rounded edge of the bow may thus assist the continuous track assembly 106 when landing the vehicle 100. The hull 102 may also include a soft chine or hard chine between the side walls and the keel of the hull 102.

In embodiments, the hull 102 includes one or more recessed portions 142. The continuous track assembly 106 may be disposed exterior to the hull 102 and coupled to the hull 102 by way of the recessed portion 142. For example, the recessed portion 142 may be on the left and right sides of the hull 102. The continuous track assembly 106 may thus be disposed below the sides of the hull 102 in the recessed portion 142, thereby reducing a width of the vehicle 100. For instance, the vehicle 100 may include a width of between five feet and eight feet, or less. By such width, the vehicle 100 may be transportable on a trailer without requiring an oversize load certification. It is further contemplated that the vehicle 100 may be wider than eight feet. In some instances, the vehicle 100 may include a sufficiently small width to be carried by a standard truck bed. The size of the vehicle 100 may thus be relatively easy to transport by trailer or truck bed. Similarly, the size of the vehicle 100 may allow for ease in storage during the off-season and for maneuvering on tight ice patches. The vehicle 100 is depicted as including a hard chine between the keel of the hull 102 and the recessed portion 142. Such arrangement may be beneficial in providing an ease in attaching the continuous track assembly 106 within the recessed portion 142.

In embodiments, the continuous track assembly 106 includes a left-side assembly and a right-side assembly which are independently driven and controllable for propelling and steering the vehicle. By the independent control of the continuous track assembly 106, the vehicle 100 may be considered to include differential steering (also referred to as skid steer). In embodiments, the vehicle 100 may include a zero-degree turning radius by the independent control of the continuous track assembly which may be advantageous for navigating onto patches of ice, snow, mud, slush, asphalt, grass, dirt, gravel, and the like.

The vehicle 100 may include a powertrain system for driving the continuous track assembly 106 of the vehicle 100. The powertrain system may include a number of components. For example, the vehicle 100 may include, but is not limited to, an engine 108, a hydraulic reservoir 118, and a transaxle 120. The hull 102 may also include one or more holes for coupling a drive sprocket 136 to a transaxle 120 of a powertrain system. In this regard, the transaxle 120 may cause the drive sprocket 136 to impart rotational motions onto the tread 138. The tread may then be driven in a forward or reverse direction. The engine 108 may be coupled to the chassis 110 by an engine mount 146, or the like. The vehicle 100 may also include a mechanism for controlling the powertrain system. For example, the vehicle 100 may include steering levers 148 or another mechanism suitable for skid steer control.

The engine 108 may include any power source configured to generate power known in the art, such as, but not limited to, a gasoline engine, a diesel engine, or an electric power source of various sizes and power ratings. It is herein noted the engine may be any engine generally known in the art, and may start in any way including a battery start or a pull start. The engine 108 may be then configured to supply the power to one or more components of the vehicle 100, such as the transaxle 120. In embodiments, the engine 108 provides power to the transaxle 120. In this regard, the engine 108 may transmit power to the transaxle 120 by way of a belt. The transaxle 120 may be engaged by the belt to drive the continuous track assembly 106 (e.g., by rotating the drive sprocket 136). For example, the transaxle 120 may include a variable vane hydraulic pump and a hydraulic motor. The hydraulic pump may convert the rotary motion into hydraulic pressure. Hydraulic fluid may then be pumped to the hydraulic motor for rotating the drive sprocket. The transaxle 120 may thus be considered a hydrostatic transaxle. Although the engine 108 is described as driving the transaxle 120 by a belt, this is not intended as a limitation of the present disclosure. The engine 108 may also provide a mechanical power, hydraulic power, or electrical power to the transaxle 120. For example, the engine 108 may drive one or more hydraulic pumps, either directly connected to the engine 108 or via a belt. The pumps may then be connected via hoses to a hydraulic motor. The hydraulic motors may then be provided to drive each track. By way of another example, the engine 108 may generate an electric power for driving one or more hydraulic pumps. The hydraulic pumps may then provide hydraulic fluids, via hoses, to the hydraulic motor. By way of another example, the engine 108 may be mechanically coupled to the transaxles 120. The transaxle 120 may be a mechanical transaxle which drives each track. Thus, various permutations of mechanical, hydraulic, and electric power sources and/or powertrains are contemplated. It is noted that energy may be transferred to the tracks via any components including, but not limited to, the hydrostatic transaxle, hydrostatic pump and hydraulic motor, hydrostatic transmission/differential unit with left and right brakes, manual transmission/differential unit with left and right brakes, separate transmission and differential units with left and right brakes, left and right individual belt drive system, dual transmissions with brakes, dual electric motors with gear boxes to drive each track with an electronic speed controller, or the like. The vehicle 100 may include the hydraulic reservoir 118 or other overflow tank, where the vehicle 100 includes some form of a hydraulic pump and hydraulic motor.

In embodiments, the engine 108 and the transaxle 120 are disposed in the fore or bow end of the vehicle 100. By the placement of the engine 108 and the transaxle 120 in the fore end of the vehicle 100, a center of gravity of the vehicle 100 may be similarly shifted towards the fore end of the vehicle 100. By shifting the center of gravity towards the fore end, the vehicle 100 may have an improved ability to climb onto an ice surface from the water. In this regard, the ice may include a relatively low coefficient of friction. By applying more weight over the continuous track assembly 106, a friction force (i.e., related to the normal force and the coefficient of friction) between the continuous track assembly and the ice surface may be increased allowing additional purchase by the continuous track assembly 106.

In embodiments, the vehicle 100 includes a chassis 110. The chassis 110 may be mounted to the hull 102. The chassis 110 may provide rigidity to the hull 102. The chassis 110 may also provide a mounting location for one or more components of the vehicle 100. For example, the chassis 110 may include one or more side rails 112, such as a left-side rail and a right-side rail, which may be configured to receive one or more components of the vehicle 100. It is herein noted the side rails 112 may be coupled to the hull 102 in any manner known in the art including, but not limited to, nut and bolt system, welding, or the like. The chassis 110 may also include one or more crossmembers 114. The crossmember 114 may extend between the side rails 112. The crossmembers 114 may be coupled to the side rails 112 and/or coupled to the hull 102. For example, the one or more crossmember 114 may detachably attach to the at least two side rails 112. The one or more crossmember 114 may detachably attach to the at least two side rails 112 via clamps 302, or the like. By way of another example, the one or more crossmember 114 may detachably attach to the at least two side rails 112 perpendicularly along the bottom of the hull 102, or upward out of the interior of the hull 102.

The vehicle 100 may also include one or more seats 116. The seats 116 may provide a comfortable position in which between one and three, or more, occupants may go out onto the ice. It is herein noted, the at least one seat 116 may be any outdoor vehicle seat such as, but not limited to, a boat seat including a casting seat without a backrest (also referred to as a butt seat), a bucket seat including a backrest, and the like. The seats 116 may be provided in a number of flexible seating arrangements. In embodiments, the crossmember 114 may provide a coupling between a seat 116a and the side rails 112 of the chassis 110. In this regard, the seat 116a may be attached to the crossmember 114 and the crossmember 114 may be attached to the side rails 112 of the chassis. The seat 116a may be pivotably attached to the crossmember 114 or may be rigidly attached to the crossmember 114. In embodiments, a seat 116b is directly coupled to the side rails 112.

The vehicle 100 may further include one or more components, such as, but not limited to one or more rear brackets 124 or a receiver hitch 126. The rear brackets 124 may be provided for receiving one or more frame members of a foldable canopy 406. The receiver hitch 126 may be provided for pulling a load, such as sleds or small trailers. The receiver hitch 126 may be one component of a hitch assembly. The hitch assembly may also include a tube 130 disposed along the bottom of the transom 128. The vehicle 100 may also include one or more rear add-ons. Such rear add-ons may include, but are not limited to, buckets, ice fishing augers, propane tanks, rear steps 604 (see FIG. 6A), and the like. The vehicle 100 may also include a winch mounted to a front or rear of the hull 102. The vehicle 100 may also include a sleeve which may be inserted into the hole 104. The sleeve may extend downwards from the hull 102 to the water surface. The sleeve may thus reduce cold air from coming into the vehicle 100 from the hole 104 while the hole 104 is uncovered. The vehicle 100 may also include one or more batteries. The batteries may be disposed in any suitable position, such as, but not limited to, the corners of the hull 102. For example, a first battery may be provided for starting the engine 108 and a second battery may be provided for powering various ice fishing accessories, such as a fish finder, lights, and the like without draining the primary battery. Such battery may include any battery, including, but not limited to, a 12-volt lead-acid battery.

Figure 1E:
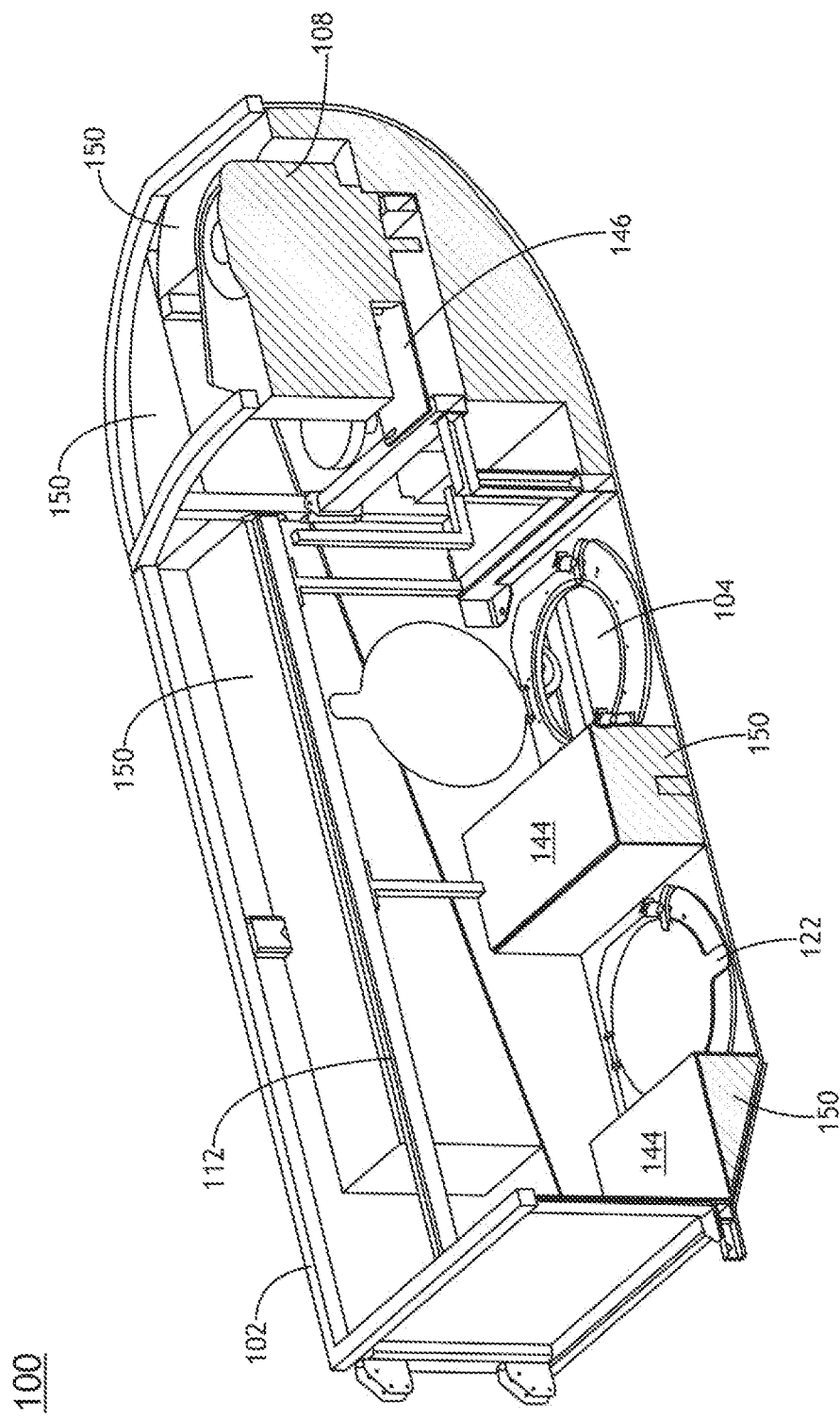
FIG. 1E illustrates a section view A-A of a vehicle, in accordance with one or more embodiments of the present disclosure.

In embodiments, the vehicle 100 includes a buoyancy material 150. Such buoyancy material 150 may improve the buoyancy of the vehicle 100. The buoyancy material 150 may be located within any suitable position of the hull 102 for improving the buoyancy of the vehicle 100. The buoyancy material 150 may be disposed within one or more buoyancy chambers 144 of the hull 102. For example, FIG. 1E depicts a cross-section including buoyancy material 150 disposed within the buoyancy chambers 144, below the engine mount 146, and around the side rails 112. Such buoyancy material 150 may include, but is not limited to, a foam. The foam may include any foam known in the art, such as, but not limited to, a polystyrene material, a polyurethane material, or a polyethylene material. Such foam may be any suitable type of foam, such as, but not limited to, a two-part liquid which expands and sets, a foam which is cut to a desired shape, or a foam which is blown-in and allowed to set. The foam may also include a closed-cell foam, an open-cell foam, or any other foam known in the art.

The buoyancy material 150 may thus improve the buoyancy of the vehicle 100 when a buoyancy effect of the hull is reduced, such as when the holes 104 are opened and the vehicle 100 is in the water. This may occur when the holes 104 have been opened for fishing on the ice and the ice has subsequently experienced as breakthrough event causing the vehicle 100 to fall in the water. The holes 104 may be disposed in the keel which may be below a waterline of the vehicle 100. When in the water, the water may ingress into the vehicle 100 by way of the holes 104. Advantageously, the buoyancy material may allow the vehicle 100 to be one of neutrally buoyant or positively buoyant when the holes 104 are unsealed and the vehicle 100 is in fresh water (e.g., water having an average density of 1 gram per cubic centimeter). In particular, the hole 104 may be unsealed by the hatch 122. However, due to the volume of water displaced by the buoyancy material 150 and/or the buoyancy material 150, the vehicle 100 may be prevented from sinking when in the water. The vehicle 100 may thus include a sufficient amount of the buoyancy such that the vehicle 100 is neutrally buoyant or positively buoyant. The neutral buoyancy may then allow an occupant to close the holes 104 while the vehicle 100 is flooded, without the vehicle 100 becoming swamped and sinking. The buoyancy material 150 may be also disposed in numerous locations of the vehicle 100 to improve a bottom buoyancy and a side buoyancy, thereby preventing capsizing of the vehicle 100 when flooded.

Figure 2A:
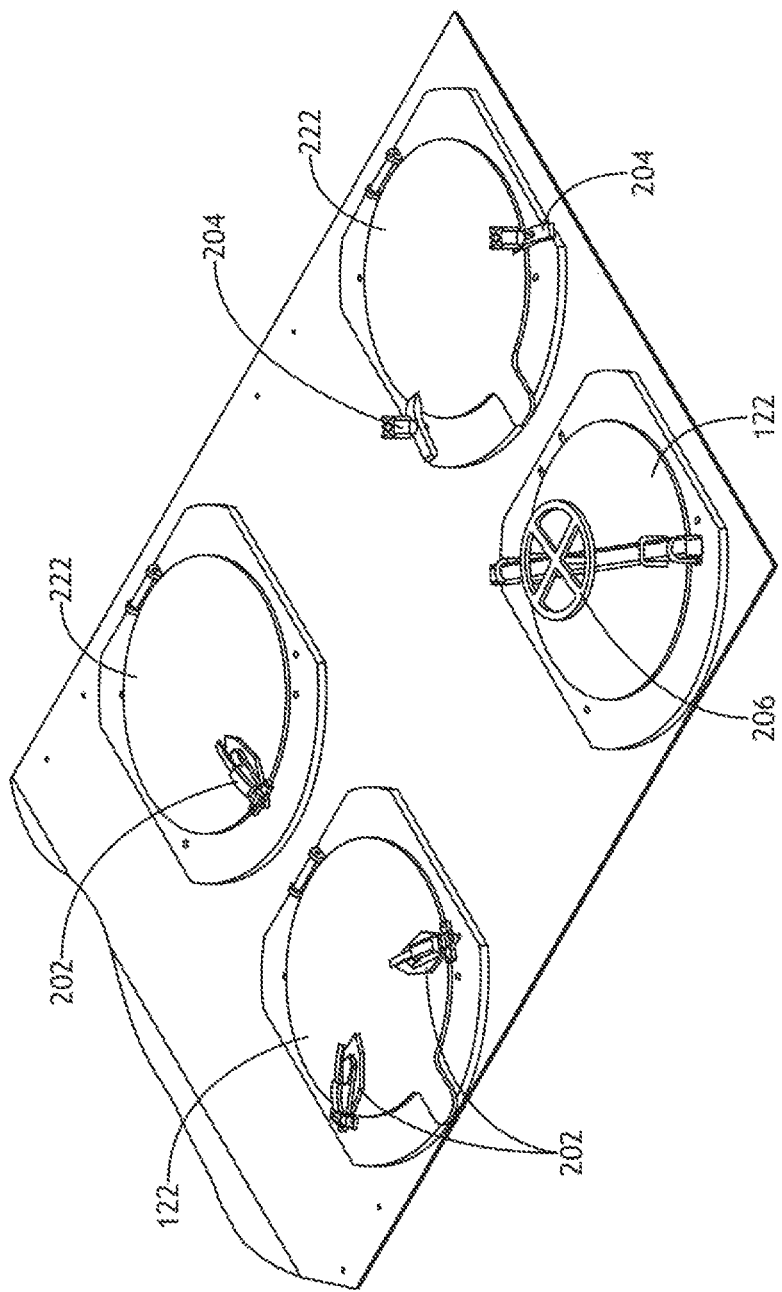
FIGS. 2A-2D illustrates a perspective view of one or more hatches of a vehicle, in accordance with one or more embodiments of the present disclosure.
Figure 2B:
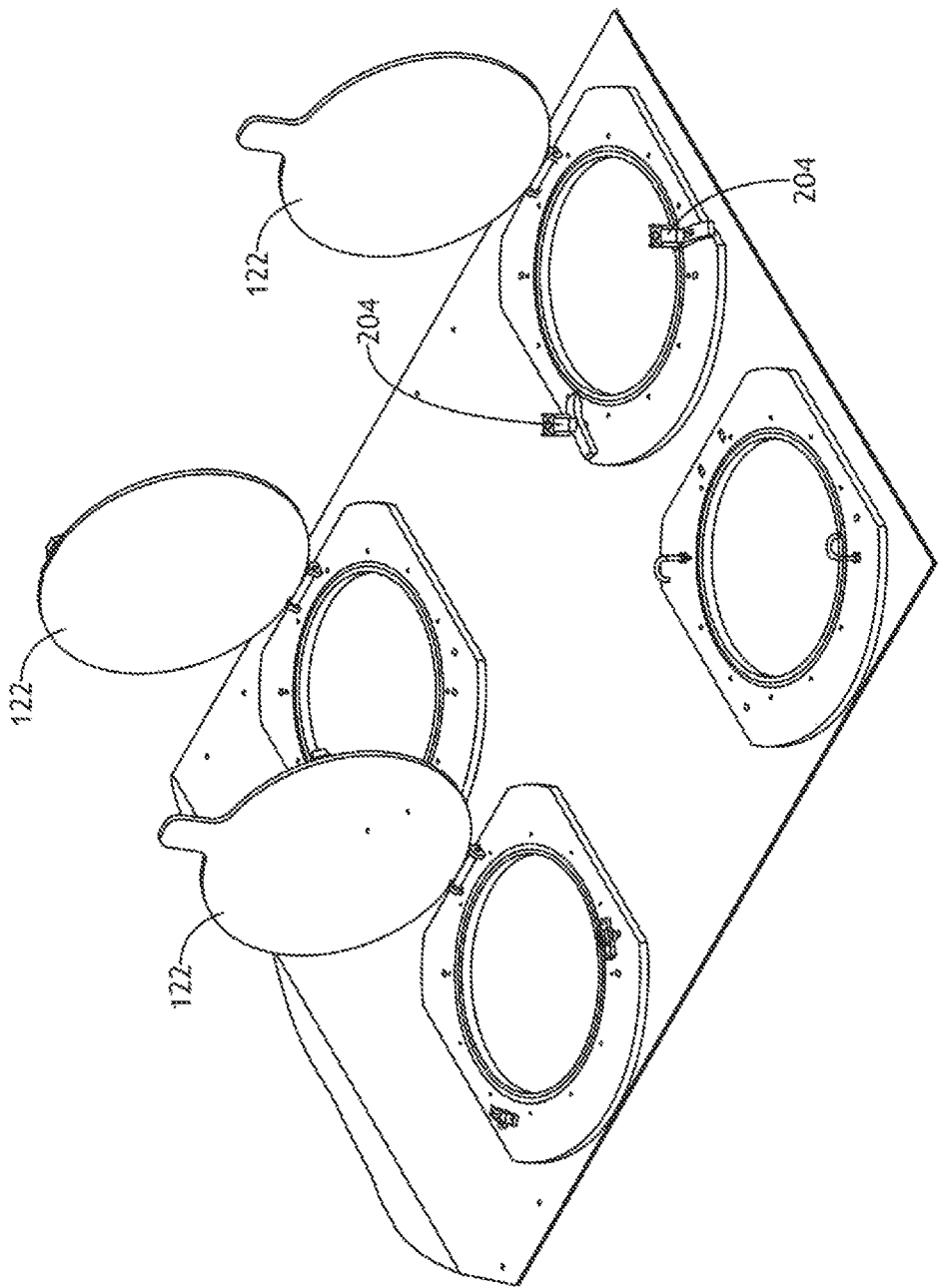
Figure 2C:
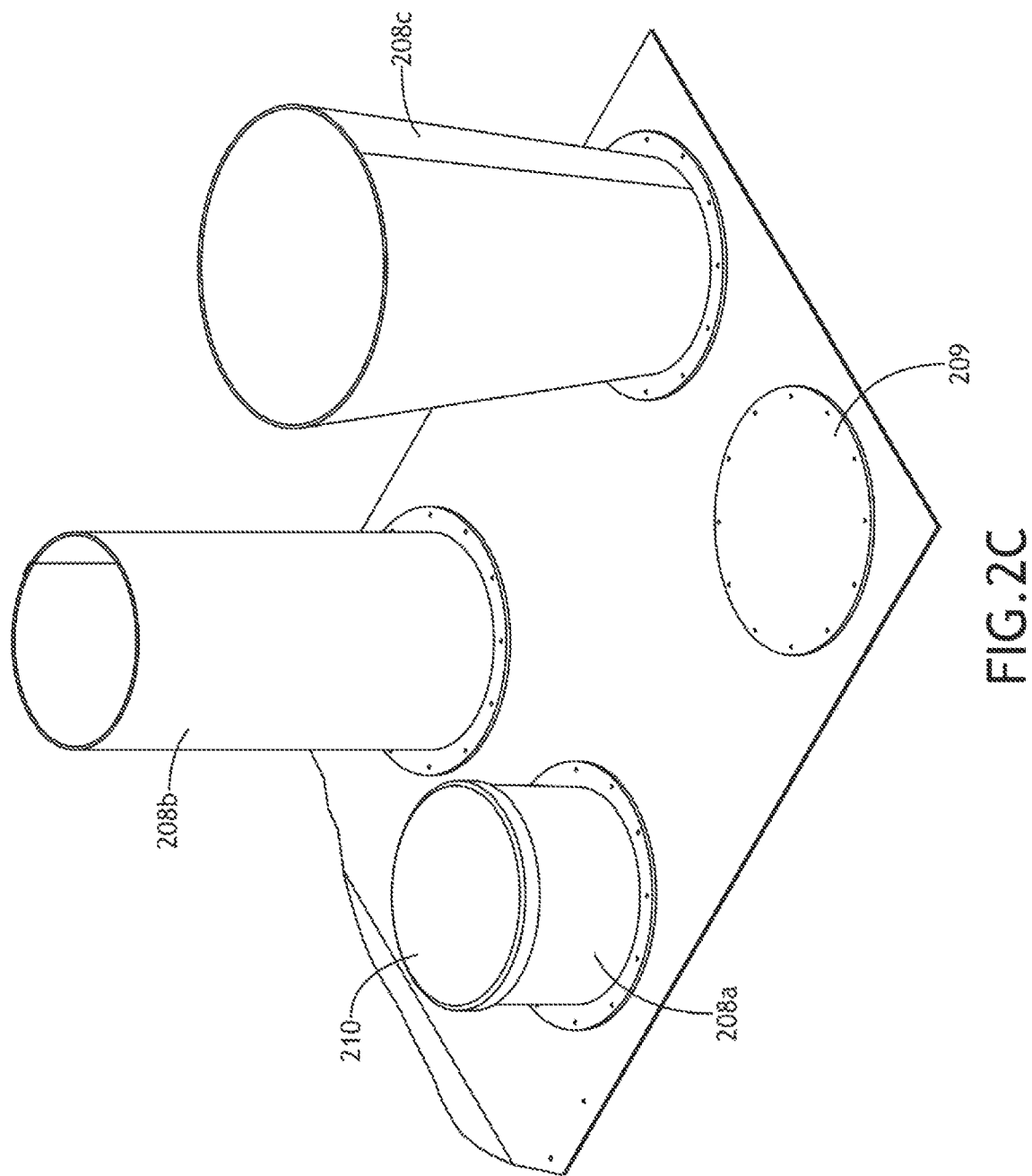
Figure 2D:
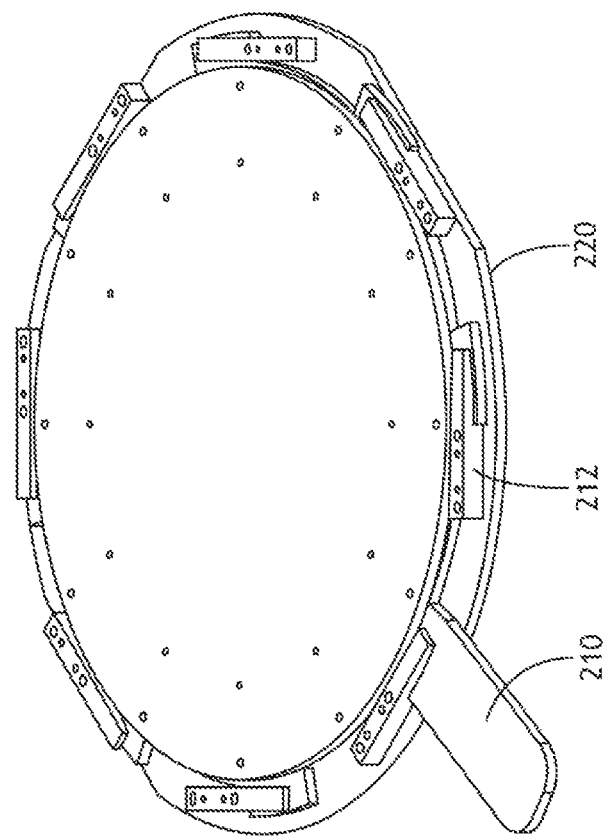
Figure 2E:
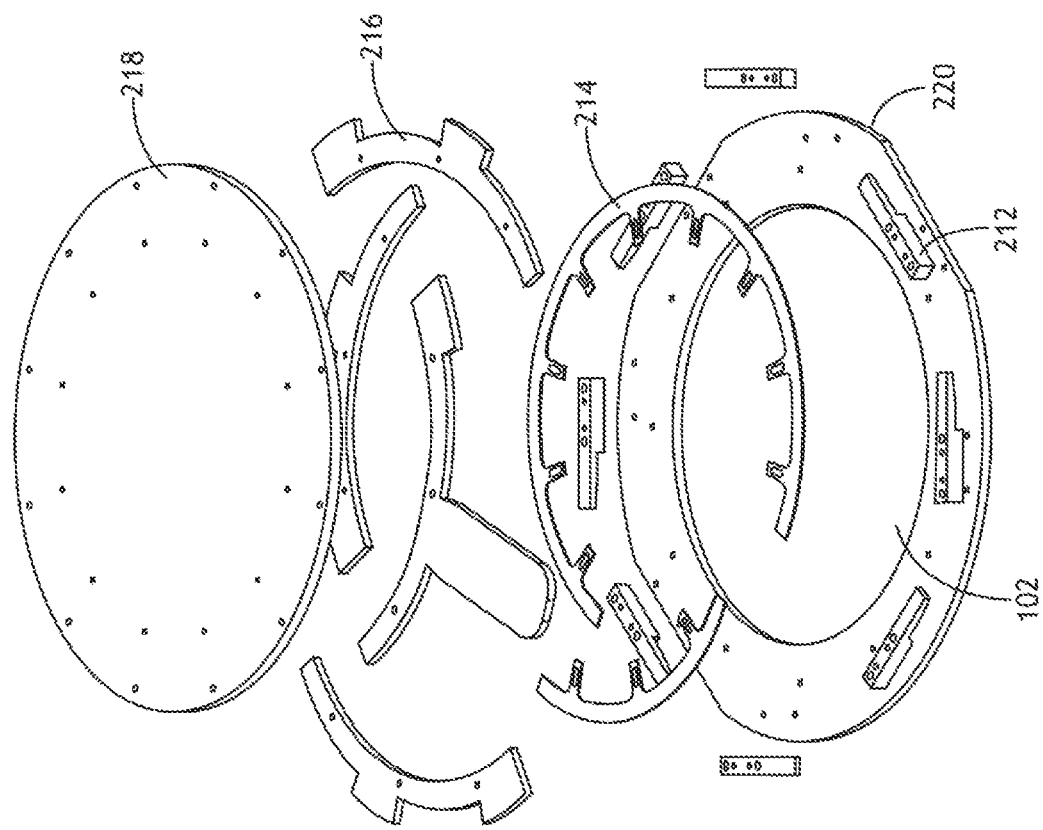
FIG. 2E illustrates an exploded view of a hatch of a vehicle, in accordance with one or more embodiments of the present disclosure.
Figure 2F:
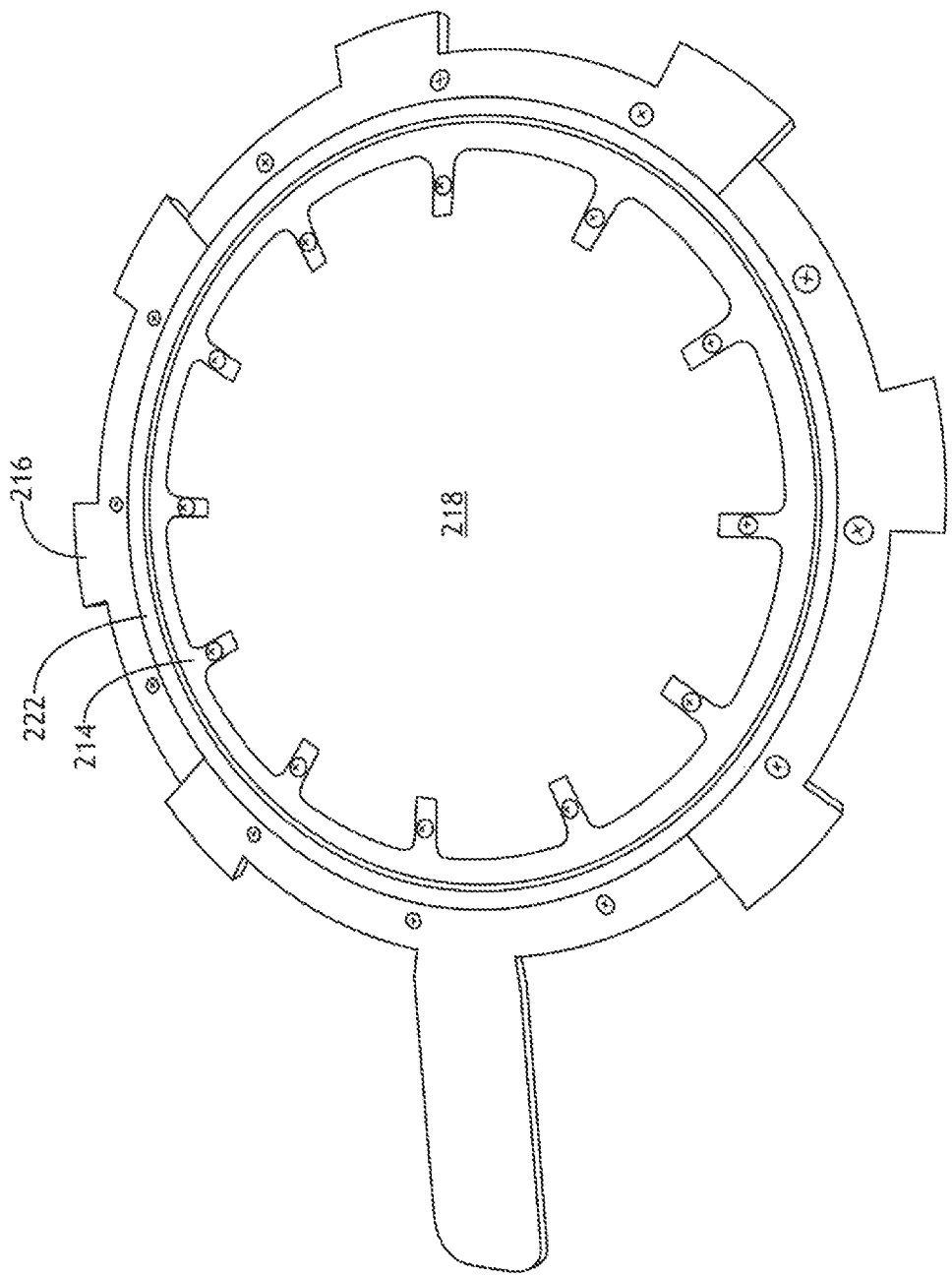
FIG. 2F illustrates a perspective view of a hatch of a vehicle, in accordance with one or more embodiments of the present disclosure.

Referring now to FIGS. 2A-2F, the hatch 122 is described, in accordance with one or more embodiments of the present disclosure. The hatch 122 may be secured to the hull 102 in a number of configurations. For example, the hatch 122 may include a latch 202 (also referred to as a freezer style latch), a clamp 204 (also referred to as a hold-down clamp), or a locking wheel 206 (also referred to as a dog assembly, a submarine-style hatch mechanism, and the like) for sealing the at least one hole (see FIG. 2A). By way of another example, the hatch 122 may include a gasket retainer 214, tabs 216, or a cover 218 (see FIGS. 2D-2F). The tabs 216 may then be inserted into one or more ears 212 disposed around the hole 104. The ears 212 may annularly disposed around the hole 104 such that hatch is detachably attachable and self-aligning by a rotational motion relative to the ears 212. For example, the ears 212 may be coupled to a base plate 220 which may then be coupled to the keel of the hull 102. The base plate 220 may be a circular base plate including the hole 104. The base plate 220 may also support the ears 212 and provide a sealing surface for a gasket 222. The ears 212 may also include a portion which defines a gap between the base plate 220 and the ears 212. The gap may then be configured to receive the tabs 216 upon rotational motion of the hatch 122. In some instances, the ear 212 includes a wedge-shaped portion such that the gap decreases along a length of the ear 212. By the wedge-shaped portion, rotation of the hatch causes the tabs 216 to be watertight with the hole 104 by a wedging action. As depicted in FIGS. 2D-2F, there are eight of the ears 212, such that that hatch 122 only needs one-eighth of a turn to lock and unlock. When the hatch 122 is detached, the hatch 122 may be positioned away from the hole 104, which serves to protect the gasket given that the gasket is disposed between the cover 218 and the gasket retainer 214. The gasket 222 may include a c-shaped rim. The gasket retainer 214 may sit inside the c-shaped rim of the gasket 222, and retain the gasket 222 to the cover 218. The gasket 222 may then provide a seal between the cover 218 and the base plate 220 for sealing the hole 104.

Although the vehicle 100 has been described as including hatches 122 for the holes 104, this is not intended as a limitation on the present disclosure. In embodiments, the hull 102 may additionally include a tube 208 configured to cover one or more of the holes 104. The tube 208 may be attached to the hull 102. The tube 208 may then extend vertically upwards from the one or more holes. A height of the tube 208 may be such that a waterline of the water is below a top opening of the tube 208 when the vehicle is disposed in fresh water. In this regard, the height of the tube 208 may be selected according to an unloaded weight of the vehicle 100 and a displaced volume of the hull 102 (e.g., the tube 208 may be a tall tube). The tube 208 may extend, from the keel of the hull 102, vertically upwards, such that a waterline is below the top opening of the tube 208. In embodiments, the top opening of the tube 208 is parallel with the top of the hull. In an exemplary embodiment, the tube 208 may extend at least twenty-four inches vertically upwards, although this is not intended to be limiting. Thus, a height of the tube 208 may be selected, at least in part, based on a draft of the vehicle 100. Advantageously, the tube 208 may allow for fishing access and also prevents water from entering the hull 102, such that a user does not need to provide a watertight seal for the tube 208 to prevent water incursion. The tube 208 may generally include any tubular shape, such as, but not limited to, a square tube or a circular tube. Where the tube 208 includes a circular tube, a diameter of the tube may be constant of vary along a height of the tube. For example, the diameter of the tube 208 may be 12 inches, as depicted by tube 208b in FIG. 2C. By way of another example, the tube 208 may be 12 inches at the base, 15-18 inches at the top, as depicted by tube 208c in FIG. 2C. Providing the tube 208c with a diameter which increases as the tube extends vertically upwards may provide increased visibility and access to the top opening from above.

The vehicle 100 may further include a tube hatch 210 configured to cover the top opening of the tube 208, as depicted by the tube 208a in FIG. 2C. The tube hatch 210 may include any combination of elements of the tube 208 and the hatch 122. In some embodiments, the waterline of the water is above the top opening of the tube 208a where the tube 208a includes the tube hatch 210. In this regard, the tube 208a may be considered a short tube. The tube hatch 210 may provide a watertight seal for the tube 208, thereby preventing water from flooding into the vehicle 100. The short tube may be advantageous, as compared to the hole, in that a rate at which water fills the hull 102 may be decreased such that there is additional time to seal the short tube in the event of an ice breakthrough event. The tall tubes may be advantageous in that the vehicle 100 may be continuously operated without fear of water incursion. In this regard, the vehicle 100 may be useable for fishing from inside the vehicle 100 during non-winter months by the tall tube. The various hatches described herein may then be locked and closed, such that the vehicle 100 may then be used like a boat during non-winter months.

The vehicle 100 may also include blocker plate 209 for the holes 104, as depicted in FIG. 2C. The blocker plate 209 may close the at least one hole 104 to restrict access, depending upon a desired number and configuration of the holes 104. For example, the holes 104 are depicted as being in a two-by-two configuration, although this is not intended to be limiting.

Figure 3A:
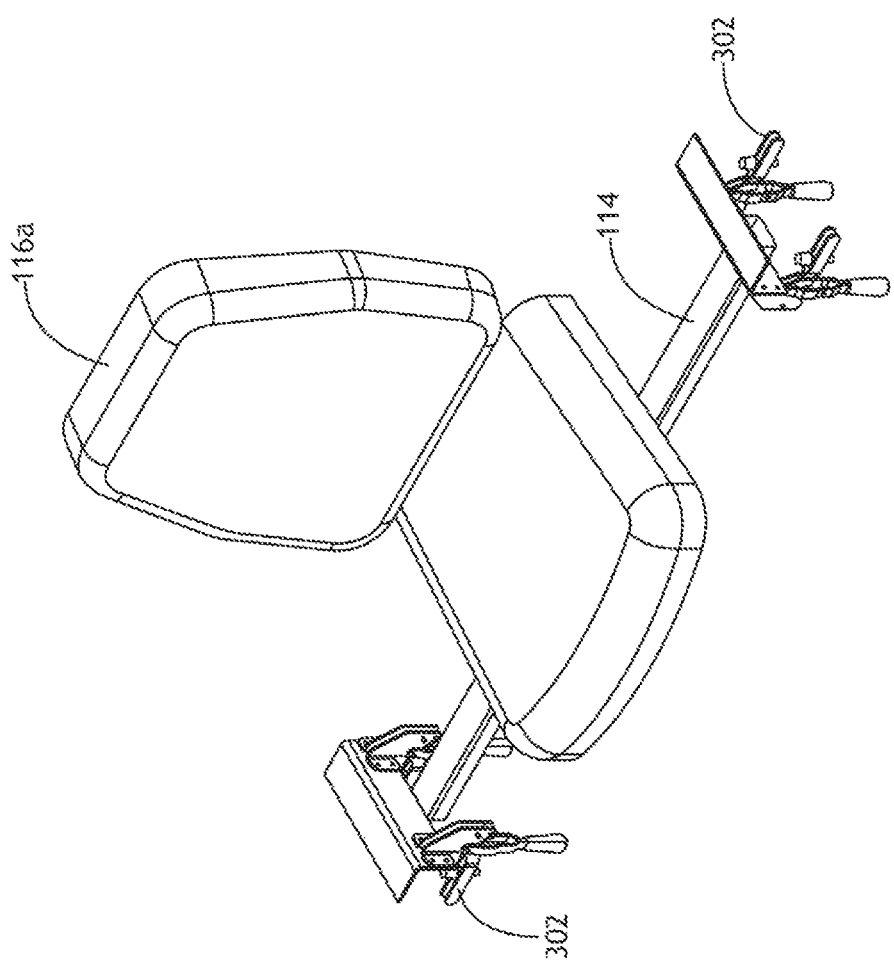
FIGS. 3A-3B illustrates a perspective view of a cross-member and one or more seats of a vehicle, in accordance with one or more embodiments of the present disclosure.
Figure 3B:
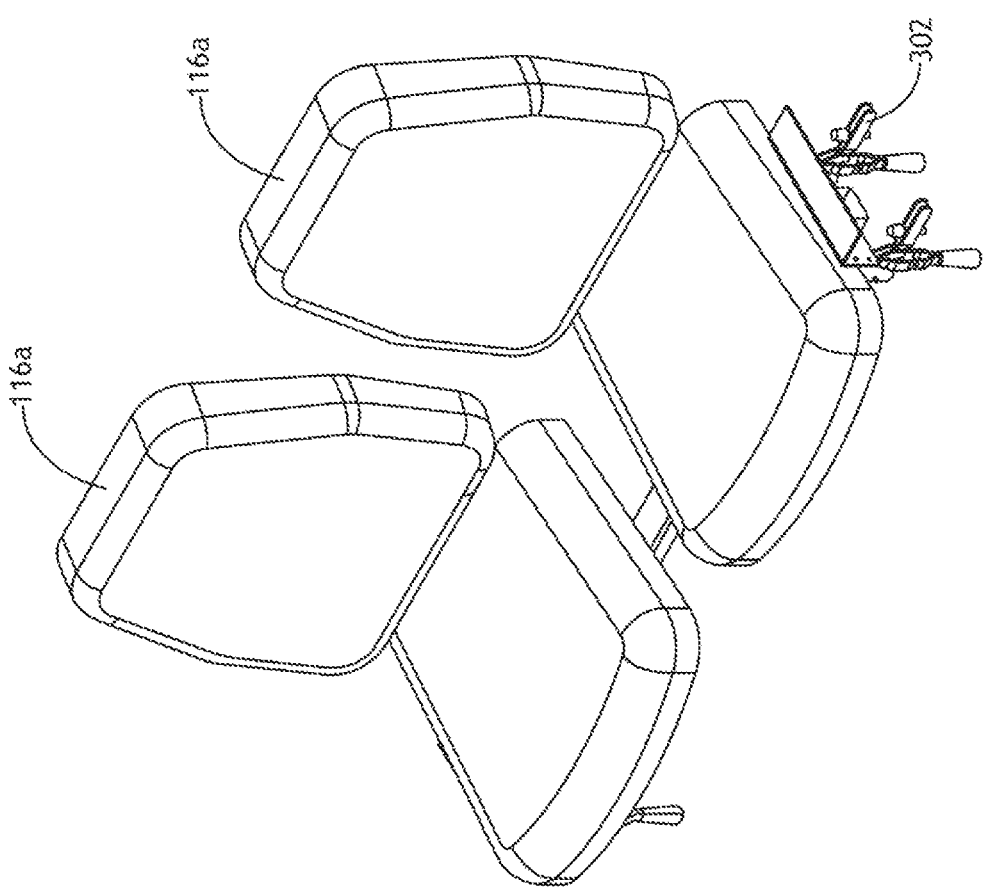

Referring now to FIGS. 3A-3F, the seat 116 is described, in accordance with one or more embodiments of the present disclosure. In embodiments, the crossmember 114 is detachably attached to the side rails 112. For example, the crossmember 114 may include one or more clamps 302 which are configured to clamp the crossmember 114 to the side rails 112. By clamping the crossmember 114 to the side rails 112, a fore and aft position of the seat 116 may be adjustable which may be advantageous in adjusting which hole 104. The seat 116 may then be positioned to accomplish a comfortable driving position (e.g., the seat being disposed in the middle of the fishing area) and a comfortable fishing position (e.g., the seat being disposed to the rear of the fishing area). It is further contemplated that the crossmember 114 may be fixedly attached to the side rails 112, such as by a weld or a bolted connection. The crossmember 114 may include any number of seats 116. For example, FIG. 3A depicts a seat 116a coupled to the crossmember 114. The seat 116a may be positionable along the at least two side rails 112 by the crossmember 114. By way of another example, FIG. 3B depicts two of the seats 116a coupled to the crossmember 114. It is contemplated that two or fewer seats may be desirable in maintaining a sufficiently reduced width of the vehicle 100 for transportation purposes. In embodiments, a lateral position of the seat 116 may also be adjusted relative to the crossmember 114. For example, the seat 116 may be clamped to the crossmember 114.

Figure 3E:
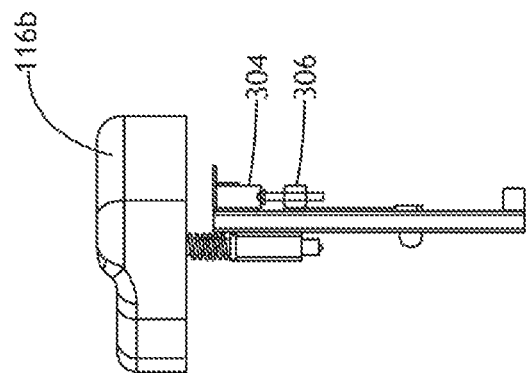
FIG. 3E illustrates a side view of a seat of a vehicle, in accordance with one or more embodiments of the present disclosure.
Figure 3D:
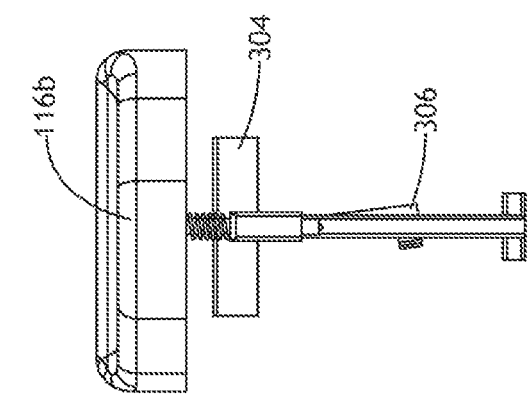
FIG. 3D illustrates a front view of a seat of a vehicle, in accordance with one or more embodiments of the present disclosure.
Figure 3C:
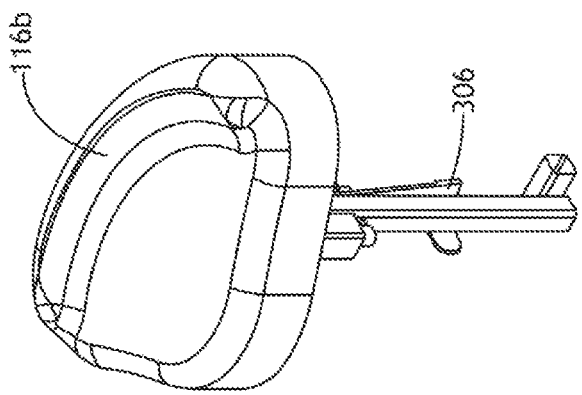
FIG. 3C illustrates a perspective view of a seat of a vehicle, in accordance with one or more embodiments of the present disclosure.

Although the vehicle 100 has been described as including the seats 116 attached to the crossmember 114, this is not intended as a limitation of the present disclosure. In embodiments, the seat 116 is attachable to the side rails 112. For example, FIGS. 3C-3E depicts a seat 116b which may be detachably attached to the side rails 112 by placing a seat rail tube 304 of the side rails 112, and clamping the seat rail tube 304 to the side rail 112 by a clamp 306 or the like. By clamping the seat rail tube 304 to the side rail 112 by the clamp 306, a fore and aft position of the seat 116b may be adjustable. A rotation of the seat 116b may also be adjusted for angling the seat 116b towards a nearest of the holes 104. For example, the seat 116b may be rotated by a leadscrew or the like.

Figure 3F:
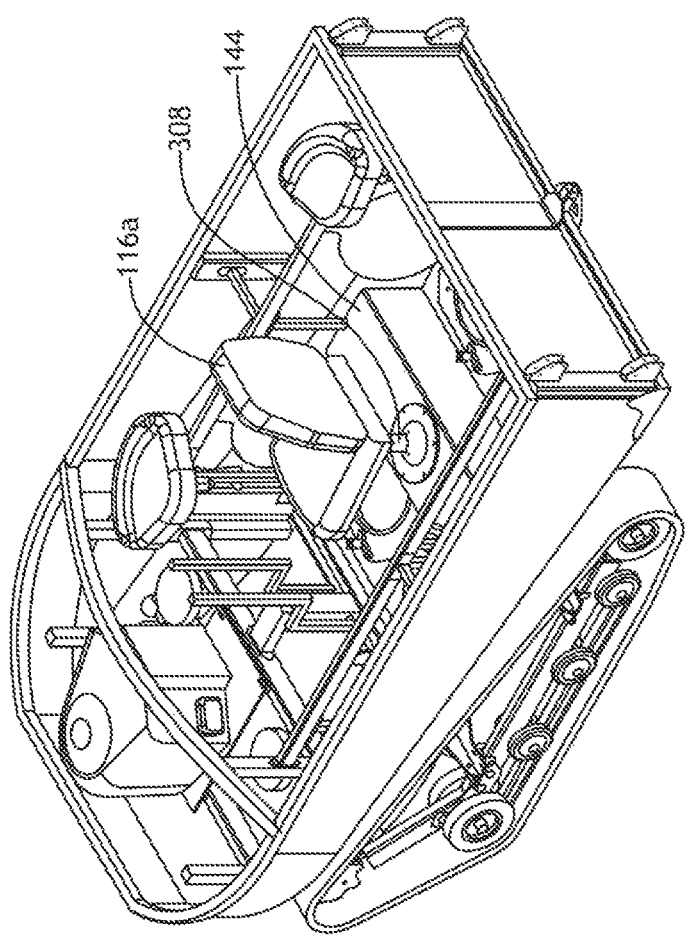
FIG. 3F illustrates a rear perspective view of a vehicle including a seat mounted to a buoyancy chamber, in accordance with one or more embodiments of the present disclosure.

In embodiments, the at least one seat 116 may be attached to the keel of the hull 102, or a component disposed therein. For example, FIG. 3F depicts the seat 116a attached to the buoyancy chamber 144. The seat 116a may be attached to the buoyancy chamber 144 by a pivotable post 308, or the like. The pivotable post 308 may provide the ability to adjust a rotation of the seat 116a for accessing any of the holes 104. In embodiments, the pivotable post 308 is detachable from the buoyancy chamber 144. An additional attachment may then be attached to the buoyancy chamber 144, such as a rod holder, a cup holder, or the like.

Figure 3G:
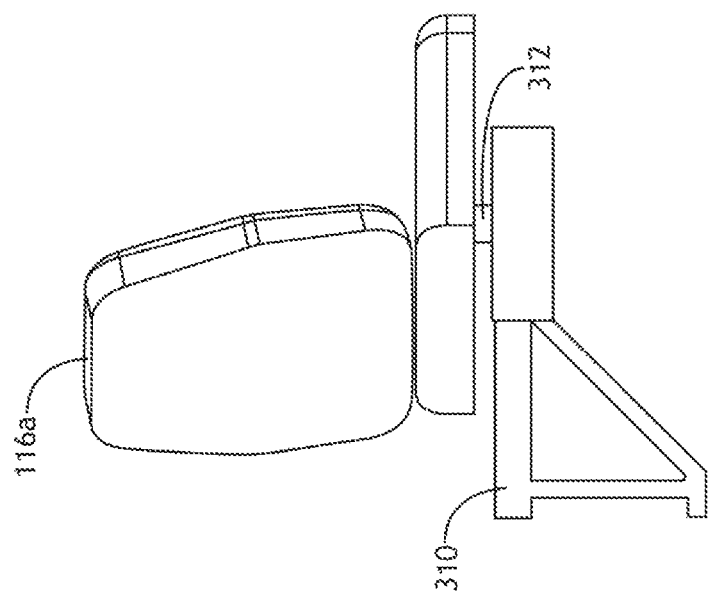
FIG. 3G illustrates a view of a pivot arm and a seat pivotably mountable to a vehicle, in accordance with one or more embodiments of the present disclosure.

In embodiments, the vehicle 100 includes a seat 116 which is pivotably coupled to the chassis 110. For example, FIG. 3G depicts the seat 116a including a pivotably-mounted slider mechanism 312. The pivotably-mounted slider mechanism 312 is attached to a pivot arm 310. The pivot arm 310 may then be pivotably attached to the side rail 112, such that the pivot arm 310 which may pivot the seat 116a relative to the chassis 110.

Referring now to FIGS. 4A-4F, the vehicle 100 may include one or more components which protect human occupants from wind, such as, but not limited to, a front windscreen 402, a foldable canopy 404, or a foldable canopy 406. The components may be couplable to one or more portions of the vehicle 100, such as, but not limited to, the hull 102 or the chassis 110. The components may be configured to provide, or substantially provide, an external shell to enclose, or substantially enclose, the interior of the hull 102 of the vehicle 100. The components may also be reversibly coupled or otherwise foldable when not in use (e.g., for transport of the outdoor vehicle 100). It is noted herein, the components may reversibly couple in any manner known in the art, including hook and loop straps, buttons, hoops, clamps, and the like. It is further noted herein, the components may be made of one or multiple materials including, but not limited to, canvas, vinyl, frame members, and the like. The components may include a windshield or side windows made of clear or substantially clear materials such as, clear vinyl or polycarbonate. The components may further include a rear entrance. The rear entrance may provide an opening/closing of the vehicle 100 when in use. For example, the rear entrance may open/close by way of a zipper, buttons, or the like. The components may further include additional fold-outs. The additional fold-outs may be configured to provide additional area enclosed, or substantially enclosed, by the components outside of the hull 102. Where the components include canopy material which is separable from frame members, the canopy material may be secured to the frame members in any suitable manner, such as, but not limited such zipper, button snaps, and the like.

Figure 4A:
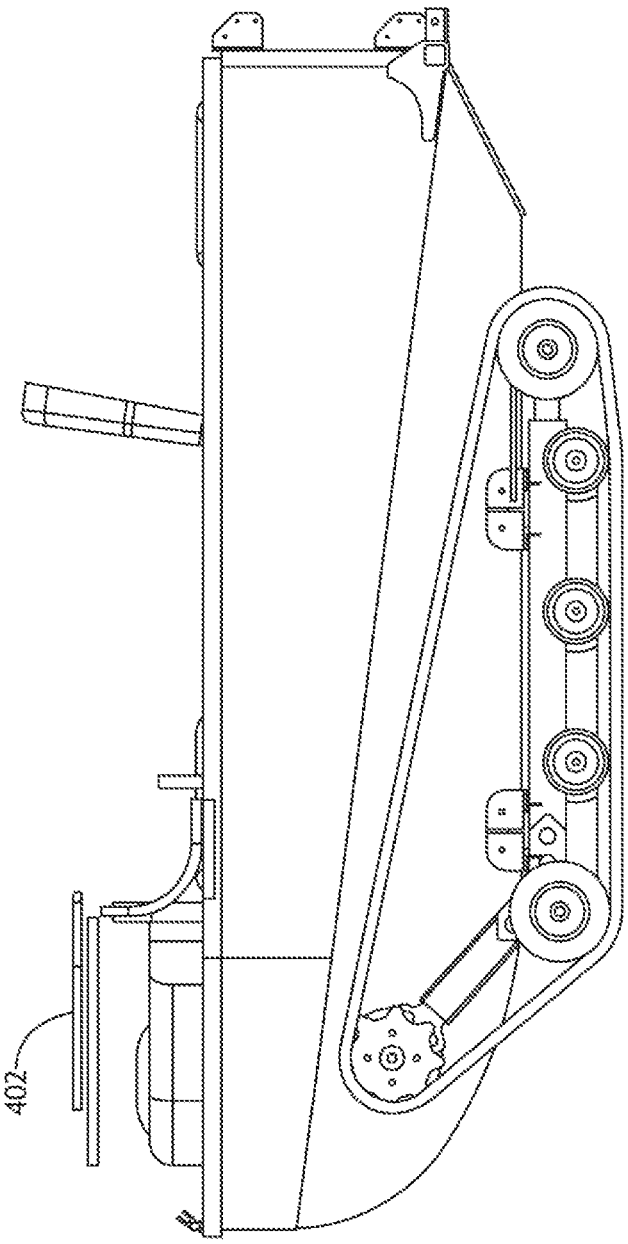
FIG. 4A illustrates a side view of a vehicle including frame members of a windscreen in a folded position, in accordance with one or more embodiments of the present disclosure.
Figure 4C:
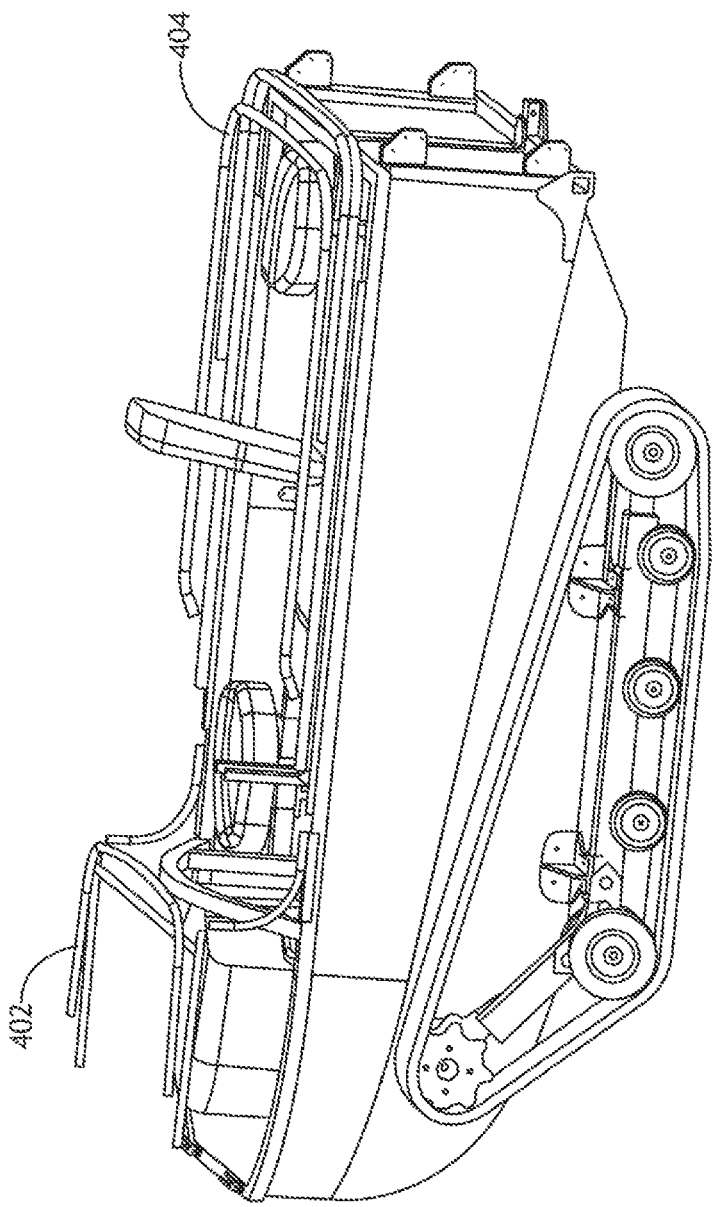
FIG. 4C illustrates a side perspective view of a vehicle including frame members of a foldable canopy in a folded position, in accordance with one or more embodiments of the present disclosure.
Figure 4D:
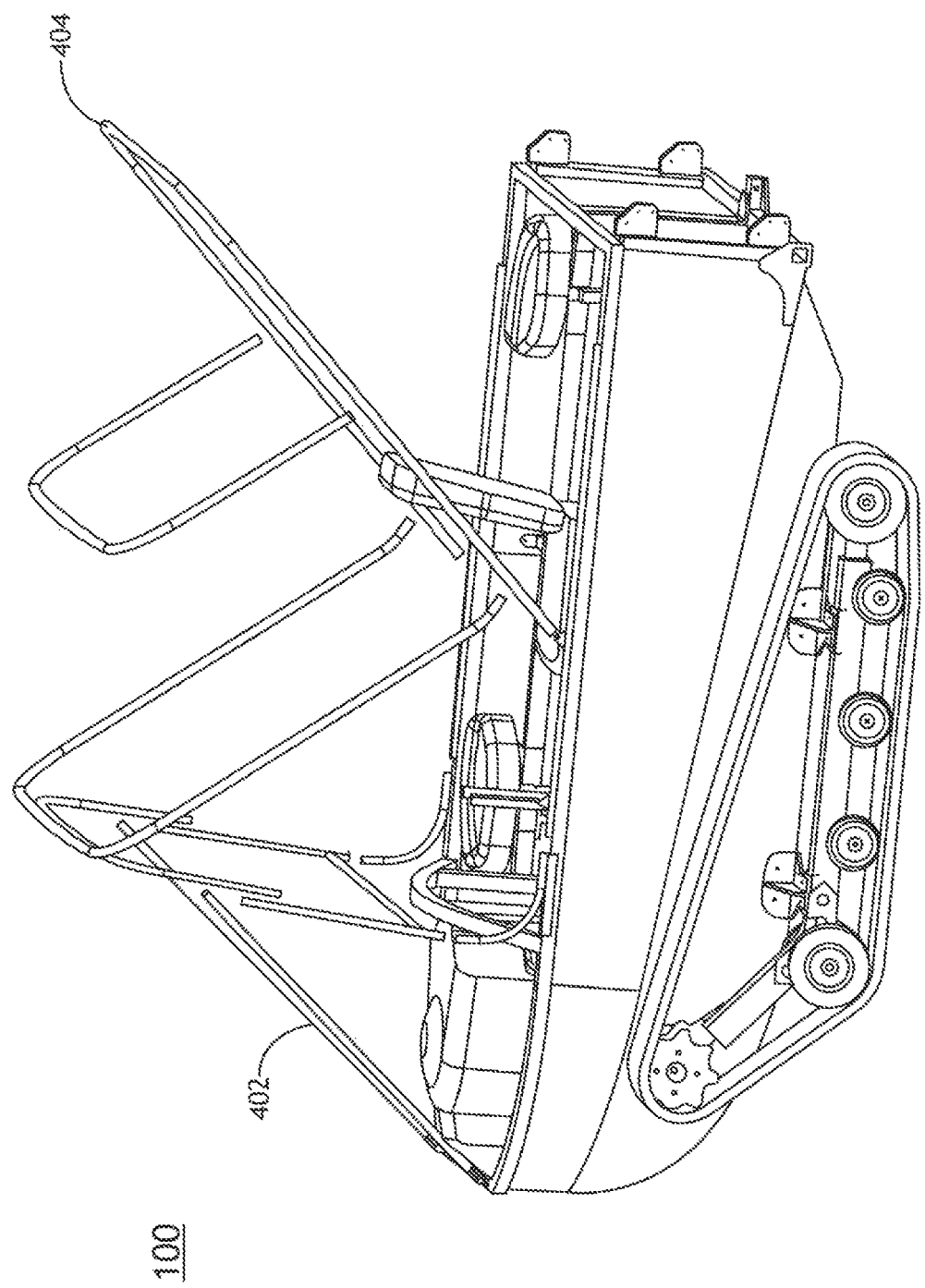
FIG. 4D illustrates a side perspective view of a vehicle including frame members of a foldable canopy in an unfolded position, in accordance with one or more embodiments of the present disclosure.
Figure 4E:
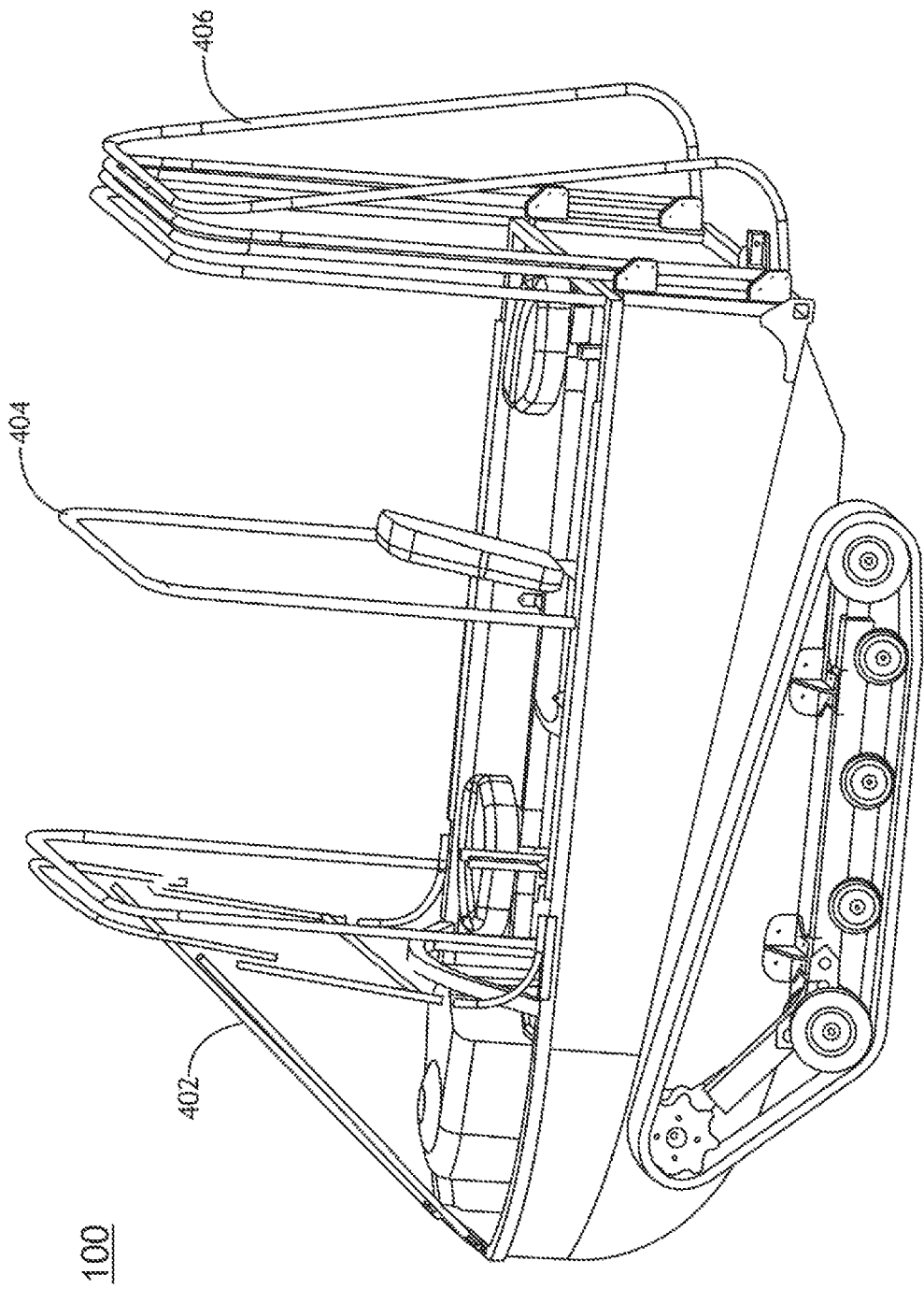
FIG. 4E illustrates a side perspective view of a vehicle including frame members of a foldable canopy in a folded position, in accordance with one or more embodiments of the present disclosure.
Figure 4F:
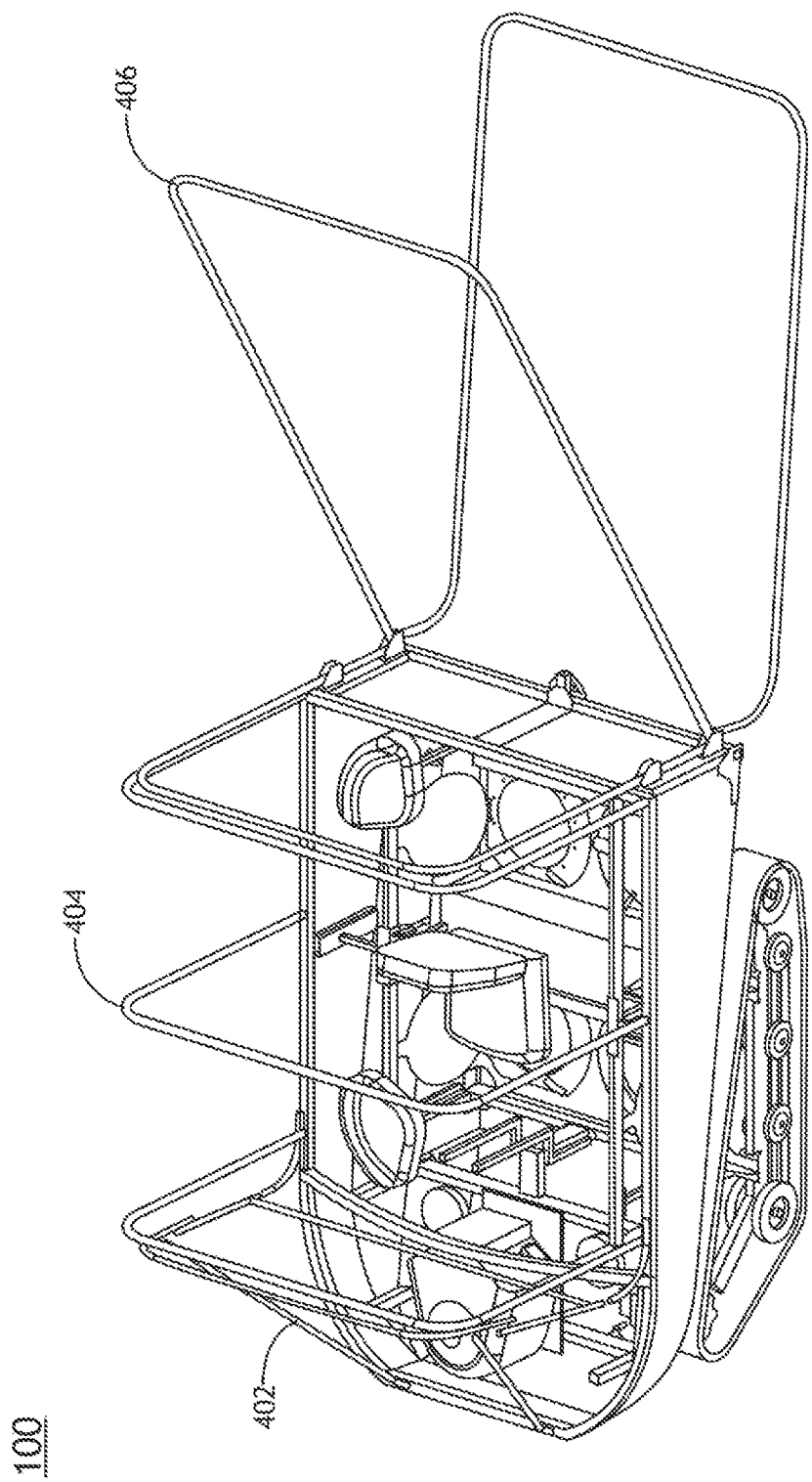
FIG. 4F illustrates a side perspective view of a vehicle including frame members of a foldable canopy in a position, in accordance with one or more embodiments of the present disclosure.

In embodiments, the vehicle 100 includes the front windscreen 402. The front windscreen 402 may be coupled to one or more components of the vehicle 100, such as, but not limited to, the hull 102. The front windscreen 402 may optionally be foldable. For example, FIG. 4A depicts frame members of the front windscreen 402 in a folded position and FIG. 4B depicts frame members of the front windscreen 402 in an unfolded position. In embodiments, the vehicle 100 includes the foldable canopy 404. For example, FIG. 4C depicts frame members of the foldable canopy 404 in a folded position and FIG. 4D depicts frame members of the foldable canopy 404 in an unfolded position. When the foldable canopy 404 is in the unfolded position, the foldable canopy may cover a top portion of the hull when the foldable canopy is unfolded. In embodiments, the vehicle 100 includes the foldable canopy 406. For example, FIG. 4E depicts frame members of the foldable canopy 406 in a folded position and FIG. 4F depicts frame members of the foldable canopy 406 in an unfolded position. The foldable canopy 406 may thus extend from a rear surface of the hull 102 for covering ice behind the vehicle 100 when the foldable canopy 406 is unfolded. The foldable canopy 406 may thus provide an additional space into which holes may be drilled behind the vehicle 100. Folding the front windscreen 402, the foldable canopy 404, and/or the foldable canopy 406 into the folded position may be advantageous for reducing a drag coefficient when the vehicle 100 is transported by trailer. Conversely, folding the front windscreen 402, the foldable canopy 404, and/or the foldable canopy 406 into the unfolded position may be advantageous in protecting occupants of the vehicle 100 from the wind during ice fishing. The vehicle 100 may thus be provided with multiple canopy or enclosure options for achieving a desired level of wind protection. The vehicle 100 may further include a heater which may be useable in combination with the front windscreen 402, the foldable canopy 404, or the foldable canopy 406.

Figure 5:
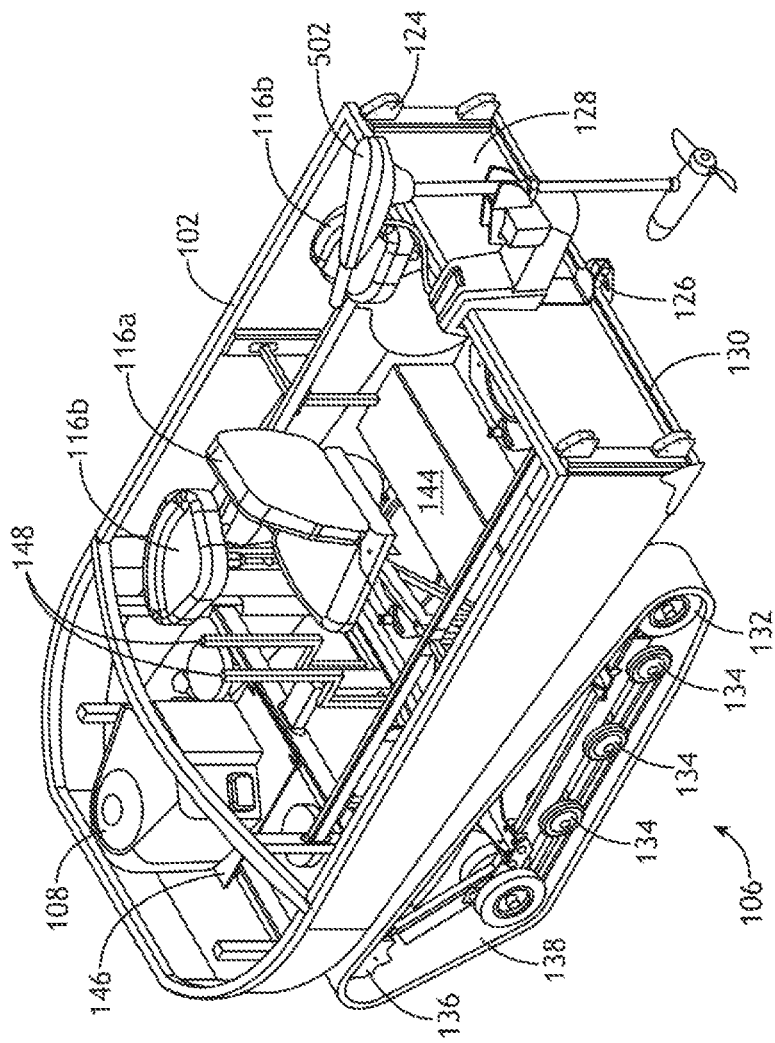
FIG. 5 illustrates a perspective view of a vehicle including an outboard motor, in accordance with one or more embodiments of the present disclosure.

Referring now to FIG. 5, a water propulsion means for the vehicle 100 is described, in accordance with one or more embodiments of the present disclosure. The vehicle 100 may be positively buoyant, such that the vehicle floats in freshwater. In embodiments, the tread 138 acts as a paddle for displacing water and providing a motive force. In embodiments, the vehicle 100 includes an outboard motor 502. The outboard motor 502 may be coupled to a rear of the hull 102. The outboard motor 502 engage a rotor to provide a motive force for the vehicle 100 when disposed in water. The outboard motor 502 may also include tiller for controlling a direction of the vehicle 100. The outboard motor may also include an adjustable trim. In this regard, the outboard motor may be trimmed out for angling the rotor away from the water. Trimming out the outboard motor may prevent interference between the rotor and an ice surface when the vehicle 100 is disposed on the ice surface. Such outboard motor 502 may be useable in combination with or independently from the continuous track assembly 106 when the vehicle 100 is disposed in water. Although the outboard motor 502 is depicted as being coupled to the transom by a bracket assembly, this is not intended as a limitation on the present disclosure. For example, the outboard motor 502 may attach directly to the transom.

Figure 6A:
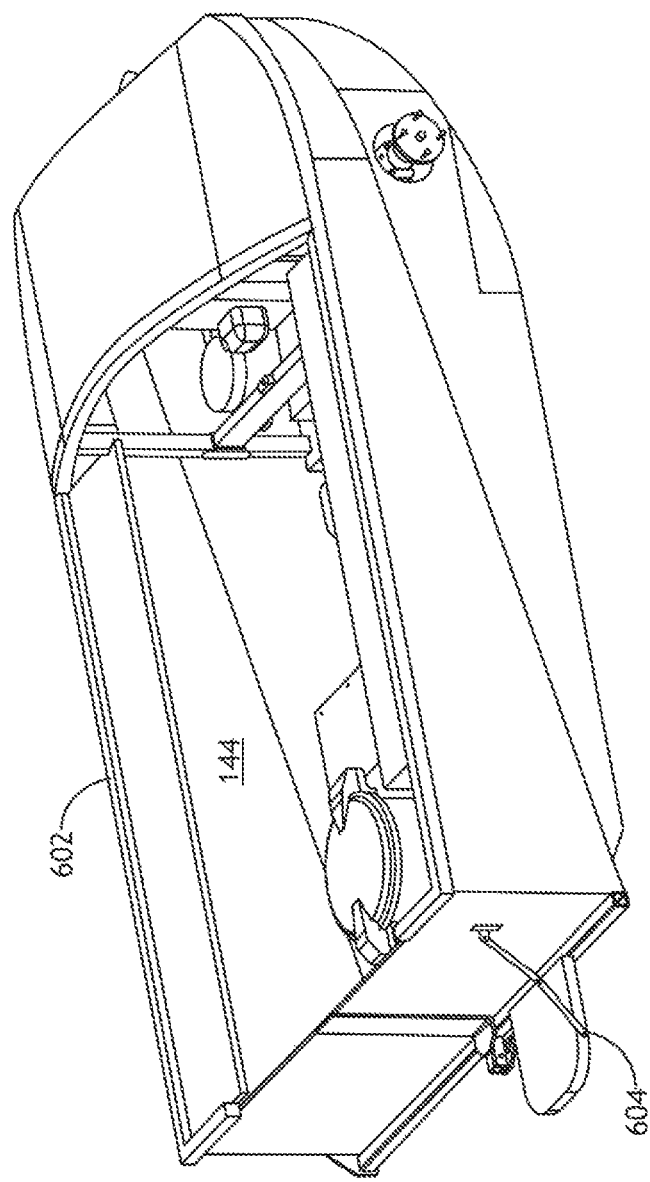
FIG. 6A illustrates a rear perspective view of a vehicle including a bench seat, in accordance with one or more embodiments of the present disclosure.
Figure 6B:
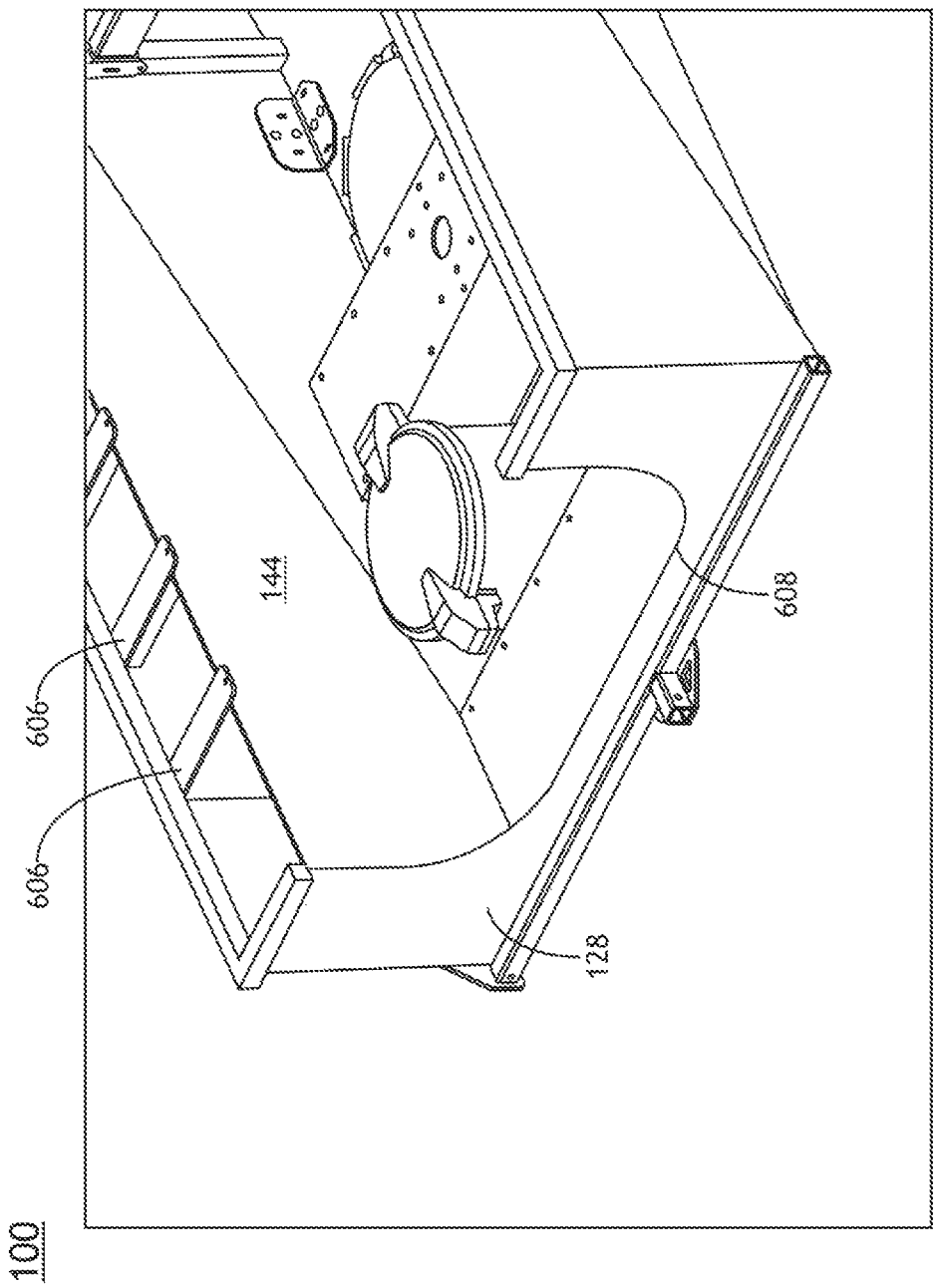
FIG. 6B illustrates a rear perspective view of a vehicle including a rear opening for a door, in accordance with one or more embodiments of the present disclosure.

Referring now to FIG. 6A-6B, although the vehicle 100 has been described as including the seats 116, this is not intended as a limitation of the present disclosure. In embodiments, the vehicle 100 may include one or more bench seats 602. The bench seats 602 may be arranged in a number of configurations. For example, the bench seats 602 may be arranged inside of the hull 102 on one or more of the port side or the starboard side. The bench seats 602 may be disposed above the buoyancy chambers 144. In this regard, the buoyancy chambers 144 may ensure that the seat of the user sitting on the bench seats 602 is above the waterline when the vehicle 100 has taken on water. The bench seat 602 may be supported by one or more support members 606 which are coupled to the hull 102. The support members 606 may also be coupled to the buoyancy chamber 144. By coupling the support members 606 to the buoyancy chamber 144, a rigidity of the buoyancy chamber 144 may be increased (e.g., where the buoyancy chamber 144 is a panel). The buoyancy chamber 144 disposed below the bench seats 602 may also be used as a storage chamber.

In embodiments, the vehicle 100 may include one or more doors. For example, the door may be mounted to the transom 128. As depicted in FIG. 6B, the transom 128 may include a rear opening 608 for the door. The door may be coupled to the hull 102 by a hinge coupling (not depicted) or the like. For example, the door may be folded downwards by the hinge coupling such that the door may provide a ramp for wheelchair or easier access to the interior of the vehicle 100, by way of the rear opening 608. The door may include a gasket for providing a water tight seal with the hull 102. The door may also include a mechanical lock to lock the door and ensure the gasket is sealed to the hull 102, thereby preventing water ingress by way of the rear opening 608.

Referring generally again to FIGS. 1A-6B, although much of the present disclosure is directed to the vehicle 100 for the purpose of ice fishing, this is not intended as a limitation of the present disclosure. While the various aspects of the vehicle 100 may be advantageous for ice fishing, the vehicle 100 may also be useable to drive in a number of conditions, such as, mud, snow, dirt, gravel, asphalt, concrete, grass, and the like. The vehicle 100 may also be usable for other purposes than fishing, such as, but not limited to, duck hunting or to transport materials. In particular, the vehicle 100 may drive through extremely muddy conditions into water, float in the water while hunting and drive back out. The foldable enclosure can be optionally configured for a duck blind or the like.

In embodiments, the vehicle 100 includes a relatively small footprint. For example, a footprint of the vehicle 100 may be such that the vehicle 100 is configured for transportation in the back of a pickup bed or on a standard five-foot by ten-foot trailer.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A vehicle, comprising:
   a hull defining at least one hole in a keel of the hull, the at least one hole provided for ice fishing from within the vehicle;
   a hatch configured to attach to the hole, wherein the hatch includes a gasket configured to provide a watertight seal for the at least one hole when the hatch is attached to the hole;
   a chassis coupled to the hull;
   at least one seat coupled to the hull; and
   a first continuous track assembly and a second continuous track assembly, the first continuous track assembly and the second continuous track assembly disposed exterior to the hull and extending below the hull for supporting the vehicle when the vehicle is disposed on land, wherein the first continuous track assembly and the second continuous track assembly are configured to be independently driven for propelling and steering the vehicle;
   wherein the vehicle is positively buoyant when the hatch is attached to the at least one hole and the vehicle is disposed in water having an average density of 1 gram per cubic centimeter.

2. The vehicle of claim 1, wherein the hatch comprises at least one of latch, a clamp, or a locking wheel for attaching the hatch to the at least one hole.

3. The vehicle of claim 1, wherein the hatch is hinge-mounted to the hull.

4. The vehicle of claim 1, wherein the hull further comprises a plurality of ears annularly disposed around the at least one hole, wherein the hatch is detachably attachable and self-aligning by a rotational motion of the hatch relative to the plurality of ears.

5. The vehicle of claim 1, the chassis including a first side rail and a second side rail; the vehicle further comprising a crossmember extending between the first side rail and the second side rail; wherein the at least one seat is coupled to the hull by an attachment between the at least one seat and the crossmember.

6. The vehicle of claim 5, wherein the crossmember is detachably attached to the first side rail and the second side rail for adjusting a fore and aft position of the at least one seat.

7. The vehicle of claim 6, wherein the at least one seat is pivotably attached to the crossmember.

8. The vehicle of claim 1, the chassis including a first side rail and a second side rail; wherein the at least one seat is detachably attached to one of the first side rail or the second side rail.

9. The vehicle of claim 1, wherein at least one of the first continuous track assembly or the second continuous track assembly comprises a tread, a drive sprocket, at least one mounting bracket, and at least one idler bogey; wherein rotational motion of the drive sprocket is imparted onto the tread causing one of the first continuous track assembly or the second continuous track assembly to be driven.

10. The vehicle of claim 9, further comprising at least one hydrostatic transaxle, wherein the hydrostatic transaxle is configured to rotate the drive sprocket.

11. The vehicle of claim 1, further comprising a buoyancy material disposed within one or more buoyancy chambers of the hull, wherein the buoyancy chambers displace a volume of the water when the at least one hole is unsealed, wherein the vehicle is one of neutrally buoyant or positively buoyant when the at least one hole is unsealed by the hatch due to the volume of the water displaced by the buoyancy chambers.

12. The vehicle of claim 1, further comprising a door coupled to a rear portion of the hull.

13. The vehicle of claim 1, further comprising a front windscreen coupled to the hull, wherein the front windscreen is foldable.

14. The vehicle of claim 1, further comprising a foldable canopy coupled to the hull.

15. The vehicle of claim 14, wherein the foldable canopy is configured to cover a top portion of the hull when the foldable canopy is unfolded.

16. The vehicle of claim 14, wherein the foldable canopy is configured to extend from a rear surface of the hull for covering an area behind the vehicle when the foldable canopy is unfolded.

17. The vehicle of claim 1, wherein the hull comprises a first recessed portion and a second recessed portion, wherein the first continuous track assembly is disposed in the first recessed portion and the second continuous track assembly is disposed in the second recessed portion.

18. A vehicle, comprising:
   a hull defining at least one hole in a keel of the hull, the at least one hole provided for ice fishing from within the vehicle;
   a tube extending vertically upwards from the at least one hole and including a top opening;
   a chassis coupled to the hull;
   at least one seat coupled to the hull;
   a first continuous track assembly and a second continuous track assembly, the first continuous track assembly and the second continuous track assembly disposed exterior to the hull and extending below the hull for supporting the vehicle when the vehicle is disposed on land, wherein the first continuous track assembly and the second continuous track assembly are independently driven for propelling and steering the vehicle;

wherein the vehicle is positively buoyant when the vehicle is disposed in water having an average density of 1 gram per cubic centimeter; wherein the vehicle comprises an unloaded weight and a displaced volume such that a waterline of the water is below the top opening of the tube when the vehicle is disposed in the water.

19. The vehicle of claim 18, wherein the tube includes a diameter which increases as the tube extends vertically upwards.

20. The vehicle of claim 18, wherein the tube extends vertically upwards from the keel of the hull up to a top of the hull.

* * * * *